United States Patent [19]

Bales et al.

[11] Patent Number: 5,781,615
[45] Date of Patent: Jul. 14, 1998

[54] FULLY DISTRIBUTED MESSAGE STORAGE FACILITIES IN A DISTRIBUTED SWITCHING SYSTEM

[75] Inventors: Bruce Merrill Bales; Norman Chin-Hung Chan, both of Louisville, Colo.

[73] Assignee: Lucent Technologies Inc., Murray Hill, N.J.

[21] Appl. No.: 520,909

[22] Filed: Aug. 30, 1995

[51] Int. Cl.$^6$ ............................................. H04M 1/64
[52] U.S. Cl. ........................ 379/89; 379/93.01; 379/201
[58] Field of Search .............................. 379/67, 88, 89, 379/93, 94, 201, 93.01, 93.09, 93.31, 220

[56] References Cited

U.S. PATENT DOCUMENTS

| | | | |
|---|---|---|---|
| 4,975,829 | 12/1990 | Clarey et al. | 364/200 |
| 5,029,199 | 7/1991 | Jones et al. | 379/89 |
| 5,193,110 | 3/1993 | Jones et al. | 379/94 |
| 5,386,466 | 1/1995 | Bales et al. | 379/200 |
| 5,623,538 | 4/1997 | Petty | 379/67 |

FOREIGN PATENT DOCUMENTS

| | | | |
|---|---|---|---|
| 0105441 | 4/1984 | European Pat. Off. | H04Q 3/42 |
| 0480634 | 4/1992 | European Pat. Off. | H04Q 11/04 |

OTHER PUBLICATIONS

K. M. Huber et al., *Getting The Message with UMS*, AT&T Technology, vol. 1, No. 1, pp. 26–35. Publication Date Unknown.

*Primary Examiner*—Fan S. Tsang
*Attorney, Agent, or Firm*—John C. Moran

[57] ABSTRACT

Storing messages intended for a communication terminal in a service circuit associated with the local network of a switch node serving the communication terminal. A switch node may have one or more local networks and can use a service circuit of these networks to store the message. If the switch node does not have capacity to store the message, the switch node will request that another switch node store the message. When it is necessary to process and store a message for a communication terminal connected to a local network, the service circuit associated with the local network may be busy and unable to process the call or the service circuit may not have sufficient memory to store a message. In which case, the switch node will attempt to find a service circuit with the ability to process the message and store the message on another local network controlled by the switch node. If the switch node cannot find a single service circuit that has both processing capability and storage capability, the switch node will attempt to find a service circuit on one local network that has processing ability and a service circuit on another local network that has storage capacity. The message is then stored on a local switching network of the other switch node. If the switch node request another switch node store the message, the other switch node uses the same procedures described above for identifying a service circuit and storage capability.

42 Claims, 18 Drawing Sheets

FIG. 4

MESSAGE IDENTIFICATION CODE

| CALLED SWITCH NODE # | CALLED TERMINAL # | TIME AND DAY |
|---|---|---|

FIG. 5

MESSAGE RECORD

| 501 | 502 | 503 | 504 | 505 | 506 |
|---|---|---|---|---|---|
| MSG. ID # | STORING SWITCH NODE # | STATE OF MSG. | PRERECORD FLAG | MEDIA TYPES | HEADER POINTER |
| | | | | | |

507 SERVICE PROFILE POINTER
508 ANNOUNCEMENT POINTER

FIG. 6

MEMORY MAP

| 601 | 602 | 603 | 604 |
|---|---|---|---|
| MSG. ID | MODULE # | STORAGE ADDRESS | PRERECORDED COUNT |
| | | | |

FULLY DISTRIBUTED MESSAGE STORAGE FACILITIES IN A DISTRIBUTED SWITCHING SYSTEM

TECHNICAL FIELD

This invention relates to telecommunication switching and, in particular, to the provision of messaging services for a telecommunication switching system.

BACKGROUND OF THE INVENTION

A prior art distributed switching system having a voice mail system is illustrated in FIG. 1. In FIG. 1, voice mail system 106 is interconnected via switch node 101 to the remaining switch nodes in the telecommunication switching system. Switch nodes such as those illustrated in FIG. 1 are shown in greater detail in U.S. Pat. No. 5,386,466. The switch nodes of FIG. 1 can each have connected a maximum of 256 BRI station sets. The manner in which calls are routed through the telecommunication switching system of FIG. 1 is described in detail in U.S. Pat. No. 5,386,466. As can be seen from FIG. 1, all accesses to voice mail system 106 are via switch node 101. The result is that switch node 101 becomes a potential bottleneck for voice mail activities.

In addition, it is known within the prior art to have networks of voice messaging systems with each voice messaging system connected to a local business communication switching system. These networks of voice messaging systems allow the transfer of a message recorded by originating user on the originating user's voice messaging system to the voice messaging system that is serving the destination user. The transfer between voice messaging systems within such a network of voice messaging system is done in compressed digital form. U.S. Pat. No. 4,790,003 discloses such a system.

In addition, U.S. Pat. No. 5,029,199 discloses a voice mail system such as voice mail system 106 of FIG. 1 that has a plurality of voice processing units that are under control of a master control unit. The master control unit normally switches an incoming call to the home voice processing unit of the destination telephone station set. However, if the home voice processing unit is busy, the master control unit switches the call to another voice processing unit. The voice processing units are interconnected by an internal bus with each other and the master control unit. Whereas the system disclosed by U.S. Pat. N0. 5,029,199 increases the capacity of a voice mail system to store messages and allows more uniform growth in message capacity, the master control unit and the voice processing units still functions as an integral voice mail system that is interconnected to a telephone switching system.

In addition, it is well known to associate with an individual telephone station set an answering machine. Such answering machines have many of the characteristics associated with voice messaging systems. However, each answering machine has a finite amount of storage for voice messages. Once the storage for voice messages is exceeded, the answering machine has no mechanism for storing additional messages on other answering machines.

SUMMARY OF THE INVENTION

The foregoing problems are solved, and a technical advance is achieved by an apparatus and method in which messages intended for a communication terminal are stored in a service circuit associated with the local network of a switch node serving the communication terminal. A switch node may have one or more local networks and can use a service circuit of these networks to store the message. If the switch node does not have capacity to store the message, the switch node will request that another switch node store the message. When it is necessary to process and store a message for a communication terminal connected to a local network, the service circuit associated with the local network may be busy and unable to process the call or the service circuit may not have sufficient memory to store a message. In which case, the switch node will attempt to find a service circuit with the ability to process the message and store the message on another local network controlled by the switch node. If the switch node cannot find a single service circuit that has both processing capability and storage capability, the switch node will attempt to find a service circuit on one local network that has processing ability and a service circuit on another local network that has storage capacity. The message is then stored on a local switching network of the other switch node. When the local switching network connected to the call communication terminal has capacity to store the message, the messaging manager application will request that the stored message be transmitted to the local network in a compressed digital format. If the switch node request another switch node store the message, the other switch node uses the same procedures described above for identifying a service circuit and storage capability.

The messaging manager application executing on the home switch node (the switch node to which a communication terminal is connected) maintains a message record for each communication terminal. This message record includes message headers (who the message is from), pointers to where the full messages are stored, media types for each message, state of each record, and a service profile that defines the manner in which messages are to be played back to the communication terminal. If a message is stored on a switch node other than the home switch node, the pointer for that message will define the identity of the other switch node.

When a communication terminal requests that its messages be played back, the message record is utilized to perform this function. The message record is stored on the switch node to which the communication terminal is connected. This switch node is referred to as the home switch node. If a message is not stored on the switch node performing the playback, that switch node requests the message from the storing switch node. The message is transferred to the playback switch node a few packets at a time. The storing switch node is identified by a pointer in the message record. This eliminates the need for the playback switch node to store the entire message. The playback switch node may not be the home switch node of the communication terminal. The user of the communication terminal may be utilizing another terminal connected to another switch node. When this occurs, the other switch node requests that the home switch node transfer to it the message record for the communication terminal. The other switch node then utilizes the message record to access the messages. Advantageously, this results in that the messages are transferred to the other switch node in a compressed digital format and utilize less of the transport capability of the overall switching system. When the user has completed the playback session, the other switch node transfers the updated message record back to the home switch node. The user may not have accessed all of the messages defined in the message record and may have deleted some of these messages. When the user of a communication terminal requests playback, the switch node to which the terminal used by the user is connected may not have processing capability to process the playback session. When this occurs, the messaging manager of the switch node determines another switch node that has the processing capability and that other switch node handles the playback session. A full message channel is set up between the switch node processing of the playback session and the switch node on which the user of the telecommunication terminal is presently connected. The message record is transferred to the switch node that has the processing capability.

During the playback of a particular message, the user can skip ahead or skip back, stop the playback, etc. If the switch node that has the message is different than the playback switch node, then a messaging manager application of the playback switch node transmits control messages to a messaging manager application of the storing switch node to accomplish the various functions that the user wants to perform. In addition, if a user deletes a message that is stored on another switch node, the messaging manager application of the playback switch node transmits a control message to the messaging manager application of the storing switch node informing it to delete the message. The messaging manager application of the playback switch node then deletes all references to that message from the message record.

This feature could be used for any type of communications media, including voice, video, or fax.

Other and further aspects of the present invention will become apparent during the course of the following description and by reference to the accompanying drawing.

BRIEF DESCRIPTION OF THE DRAWING

FIG. 4 illustrates the layout of a message identification code;

FIG. 5 illustrates the layout of a message record;

FIG. 6 illustrates the layout of a memory map;

DETAILED DESCRIPTION

Figure 1:
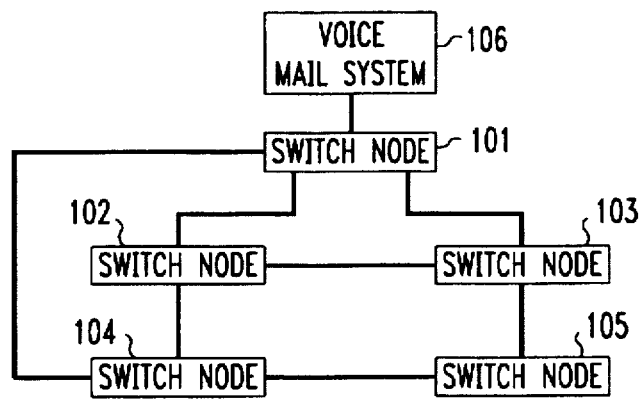
FIG. 1 illustrates a prior art telecommunication switching system with distributed switch nodes and a voice mail system.
Figure 2:
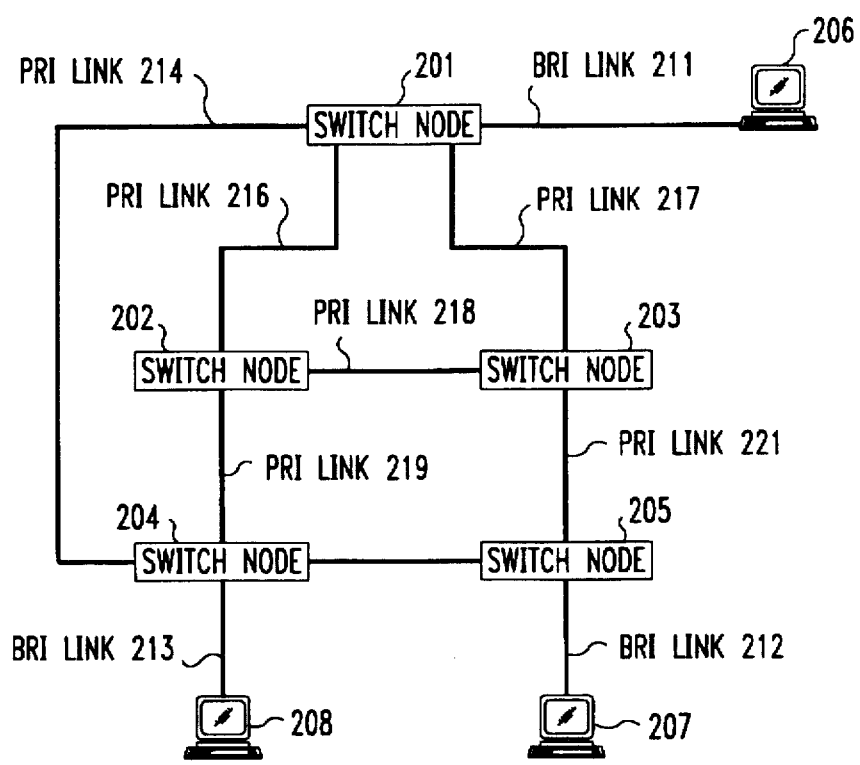
FIG. 2 illustrates a switching system having a plurality of switch nodes with each switch node having the capability for storing messages.
Figure 3:
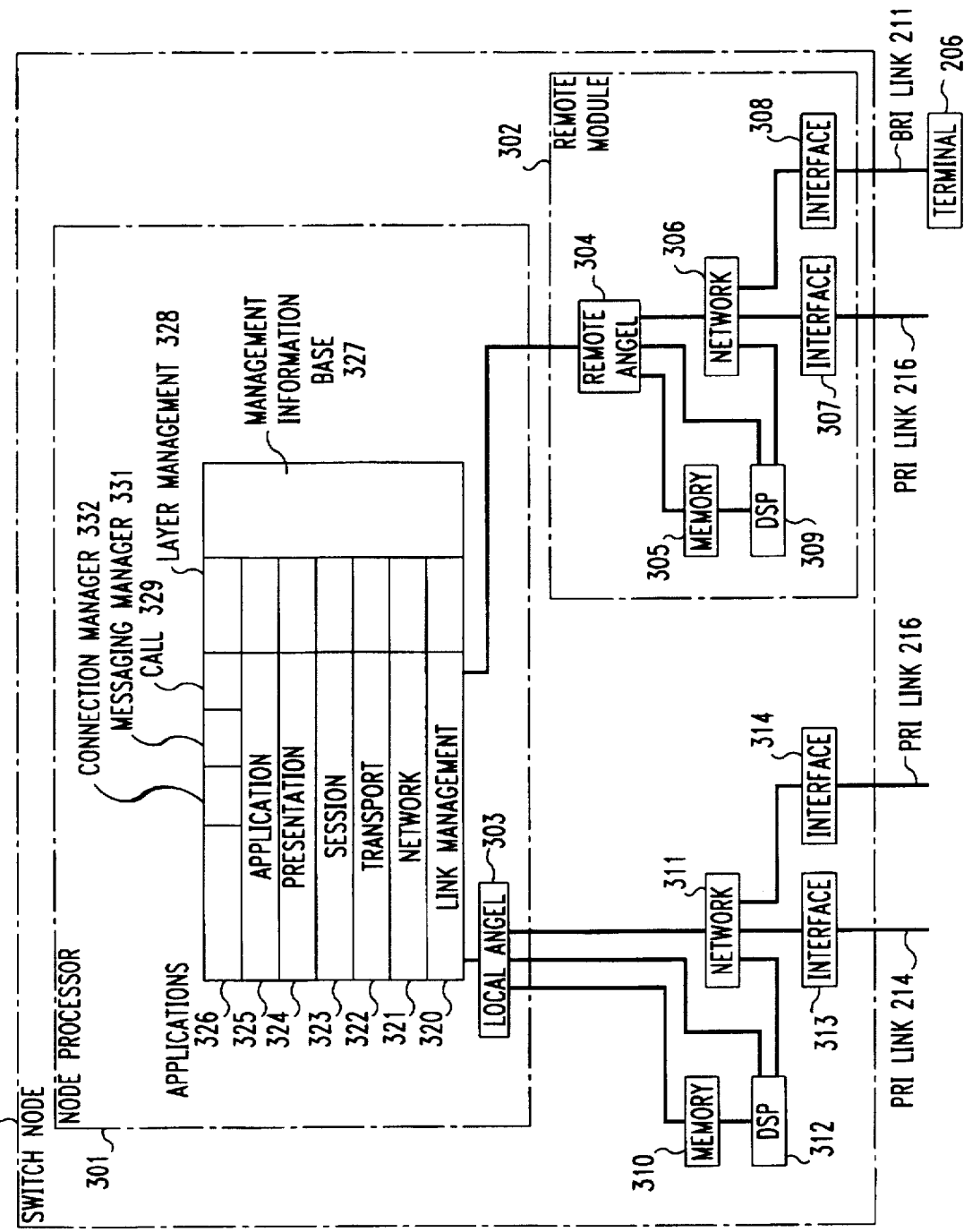
FIG. 3 illustrates in greater detail a switch node of FIG. 2.

FIG. 2 illustrates a telecommunication switching system having a plurality of switch nodes 201 through 205. The switch nodes are interconnected by a plurality of primary rate interface (PRI) links 214–222. In addition, communication terminals 206–208 are connected to various switch nodes via basic rate interface (BRI) links 211–213, respectively. Greater detail of switch node 201 is illustrated in FIG. 3. The other switch nodes have a similar structure. The manner in which elements 301–308 and 311, 313–332 function with respect to each other is set forth in greater detail in U.S. Pat. No. 5,386,466 which is hereby incorporated by reference. Digital signal processors (DSP) 309 and 312 are service circuits and provide for the generation of tones, conferencing of calls, and for the storage of multimedia messages. The performance of such functions by a DSP is well known in the art. A DSP stores the multimedia messages in memory 305 that may be random access memory (RAM) or in a hard drive unit that is mounted on the same printed wiring card as the DSP. As can be seen from FIG. 3, there is one DSP per network in the switch node. Each network has the capability of serving 64 communication terminals or a mix of communication terminals and PRI links. As illustrated in FIG. 3, a communication terminal, such as communication terminal 206, is connected to a network via an interface and a BRI link. One skilled in the art can readily see that other types of links could be utilized to interconnect a communication terminal to the network via an interface.

To better understand the operation of the telecommunication switching system illustrated in FIG. 2, consider the following examples. First, consider the example where terminal 207 places a call to terminal 206. Terminal 206 does not answer this call, and switch node 201 sends information to terminal 207 giving the option of leaving a message. The setup message that was received from terminal 207 at the start of the incoming call defined the media that terminal 207 wished to use for the call. Switch node 201 determines the media capabilities of terminal 206 and transmits back to terminal 207 the types of media that can be utilized in the message that terminal 207 may record. Terminal 207 then begins to record a message on switch node 201. Switch node 201 has already switched the call via network 306 of FIG. 3 to DSP 309. DSP 309 then changes the message being received from terminal 207 to a compressed digital message. DSP 309 stores that message in memory 305 for later retrieval by the user of terminal 206.

Consider the case where switch node 201 does not have storage facilities in DSP 309 to store the message which terminal 207 wishes to leave. Switch node 201 determines if switch node 203 has the capabilities for processing and storing the message that terminal 207 wishes to leave. If switch node 203 does not have the processing capability or storage capacity, switch node 201 determines if switch node 205 has the necessary resources. If switch node 205 has the necessary resources, switch node 201 redirects the call to switch node 203 and specifies to switch node 205 the message identification information. After recording the voice message, switch node 205 then sends a control message to switch node 201 informing it that switch node 205 has a stored message for terminal 206. Switch node 205 identifies the stored message to switch node 201 utilizing the message identification information that was transferred to switch node 205 by switch node 201. The message from switch node 205 also defines the header information for the message record. Switch node 201 then records in the message record for terminal 206 that there is a stored message on switch node 205 for terminal 206.

Consider now the example where the user of terminal 206 wants to retrieve the user's message. First, consider where the user is actually using terminal 206. Switch node 201 is responsive to the retrieval request from terminal 206 to transmit the stored message as uncompressed information to terminal 206. If the message is stored internal to switch node 201, the switch node then interconnects its local network so as to transfer the information to terminal 206. If the message is stored, for example, on switch node 205, switch node 205 transmits that message at the request of switch node 201 as a compressed digital message to switch node 201 a few packets at a time. Switch node 201 uncompresses the packets of the digital message and sends the uncompressed information to terminal 206. This is efficient since the uncompressed message takes more bandwidth to transmit from switch node 205 to terminal 206 than it does to transmit the compressed digital message to switch node 201 from switch node 205. By utilizing the method that uses the least amount of bandwidth, the resources in the path from switch node 205 to switch node 201 (PRI link 221, switch node 203, and PRI link 217) are utilized less. This allows the telecommunication switching system illustrated in FIG. 2 to communicate greater amounts of information. If switch node 201 did not have the processing capability to perform the uncompression of the digital message, switch node 201 would establish a full bandwidth path between switch node 205 and terminal 206. Switch node 205 would utilize this full bandwidth path to transfer the uncompressed message to terminal 206. The messaging manager application in switch node 201 controls the playback session and updates the message record for terminal 206 as required.

Consider now where the user of terminal 206 utilizes terminal 208 to access the user's messages. Initially, the user interacts with switch node 204 communicating that the user wants the messages for terminal 206. Switch node 204 transmits a request to switch node 201 for the message record of terminal 206. Upon receiving the message record, switch node 204 plays back the messages for terminal 206 to the user on terminal 208. Utilizing the pointers in the message record, switch node 204 requests each of the messages from the switch node storing that message. Each message is transmitted to switch node 204 a few packets at a time and at a rate that equals or exceeds that of the playback rate. As the user accesses each message, the messaging manager application on switch node 204 updates the message record. As each message is being played back, switch node 204 interacts with the storing switch node to perform the various playback functions such as skip ahead, skip back, stop, etc. Once the user is finished accessing the messages for terminal 206, the messaging manager application of switch node 204 transmits the updated message record back to the messaging manager application of switch node 201.

Since the messages that are being played back by switch node 204 on terminal 208 were initially stored to match the media capabilities of terminal 206, the messages may contain more media types than terminal 208 provides. The message record defines the media types used for each message. If terminal 208 cannot handle all of the media types in the message, switch node 204 only transmits to terminal 208 those media types that it can utilize. The user is informed by the header information of the original media types which is always transmitted to terminal 208 in whatever form terminal 208 can receive it. The simplest media form is audio information.

If terminal 206 wishes to record and then send a message to one or more terminals, switch node 201 records this message if it has the necessary resources. For example, if terminal 206 wishes to pre-record a message that is to be sent to terminals 207 and 208, switch node 201 receives and stores the message from terminal 206 and then send control messages to switch nodes 205 and 204 defining that there is a message stored on switch node 201 for terminals 207 and 208, respectively. Switch node 204 is responsive to this control message to update the message record for terminal 208. Switch node 205 performs a similar operation. When terminal 208 wishes to access the stored message on switch node 201, switch node 204 requests the transfer of that message to switch node 204 so that the message can be played back to terminal 208. If switch node 201 does not have sufficient storage to store the pre-recorded message, it requests that the message be stored on another switch node such as switch node 202. The control message from switch node 201 to switch nodes 204 and 205 then defines that the message is stored on switch node 202. Switch node 202 maintains a record of the destination terminals in a memory map table that defines all stored messages. After all of the destination terminals have retrieved the message, switch node 202 deletes the message from its storage and memory map. If the message is stored on switch node 202, switch node 201 does not maintain any references to that message after it has been transferred to switch node 202 and switch nodes 204 and 205 have been notified of the location of the message.

Consider now in greater detail how a switch node stores messages. FIG. 3 shows greater detail of switch node 201. Assume that switch node 201 receives an incoming call via PRI link 214 for terminal 206 which does not answer the call. Further assume that DSP 309 does not have the present processing capability for recording a message for terminal 206 but does have sufficient storage capacity in memory 305. Messaging manager application 331 determines that there is sufficient processing capability in DSP 312 to handle the message. The call being received via PRI link 214 is then connected through network 311 to DSP 312. Messaging manager 331 sends the pre-recording announcement information to the calling terminal. If voice or video information is required for the announcement, messaging manager 331 utilizes DSP 312 to transmit audio or video information. As DSP 312 begins to process the incoming message from the calling terminal, that information is transferred as packetized data to memory 305 under the control of local angel 303 and remote angel 304. Remote angel 304 stores the packetized data in memory 305. When the message is completed, messaging manager 331 updates the message record for terminal 206 and defines that the message is stored in remote module 302.

If switch node 201 was requested to store a message for terminal 208 by switch node 204, messaging manager 331 could utilize the DSPs and storage memories in a similar fashion as described in the previous paragraph. However, switch node 201 would not attempt to utilize only storage capacity only from switch node 203 while providing DSP processing on switch node 201 or vis versa. Each switch node must be capable of providing both processing capability and storage capability to be part of recording a message.

FIGS. 4, 5, and 6 illustrate the manner in which multimedia messages are identified to the messaging applications executing on the switch nodes of FIG. 2. For each communication terminal of FIG. 2, the messaging manager application executing in the home switch node maintains the message record illustrated in FIG. 5. The message identification code is further defined in FIG. 4 and is utilized to identify messages throughout the system illustrated in FIG. 2. For each message, the message identification code is entered into column 501 of the message record. Column 502 defines the switch node that is storing the message. Column 503 is used to define the state of the message. For example, a message can be read or unread. Column 504 is used for the pre-record flag. When set, this flag defines that the message is a pre-recorded message. Column 505 defines the media types of the message. Column 506 contains the header pointer for each message. This pointer points into a table of message headers. There is one header for each message. Service profile pointer 507 identifies the table that contains the service profile for the communication terminal. Similarly, announcement pointer 508 points to the personal announcement for the communication terminal.

FIG. 6 illustrates the memory map that is used by the messaging manager application to identify all messages stored on a switch node. The messages themselves are identified by the message identification code in column 601. Column 602 stores the module number of the module within the switch node that is storing the message. Column 603 defines the storage address of the message within the memory unit of the identified module. Column 604 stores the pre-record count. The pre-record count defines the number of terminals for which that the pre-recorded message is intended. As each terminal accesses the pre-recorded message, the prerecorded count field is decremented by one. Once the pre-recorded count is zero, the message is deleted.

Figure 7:
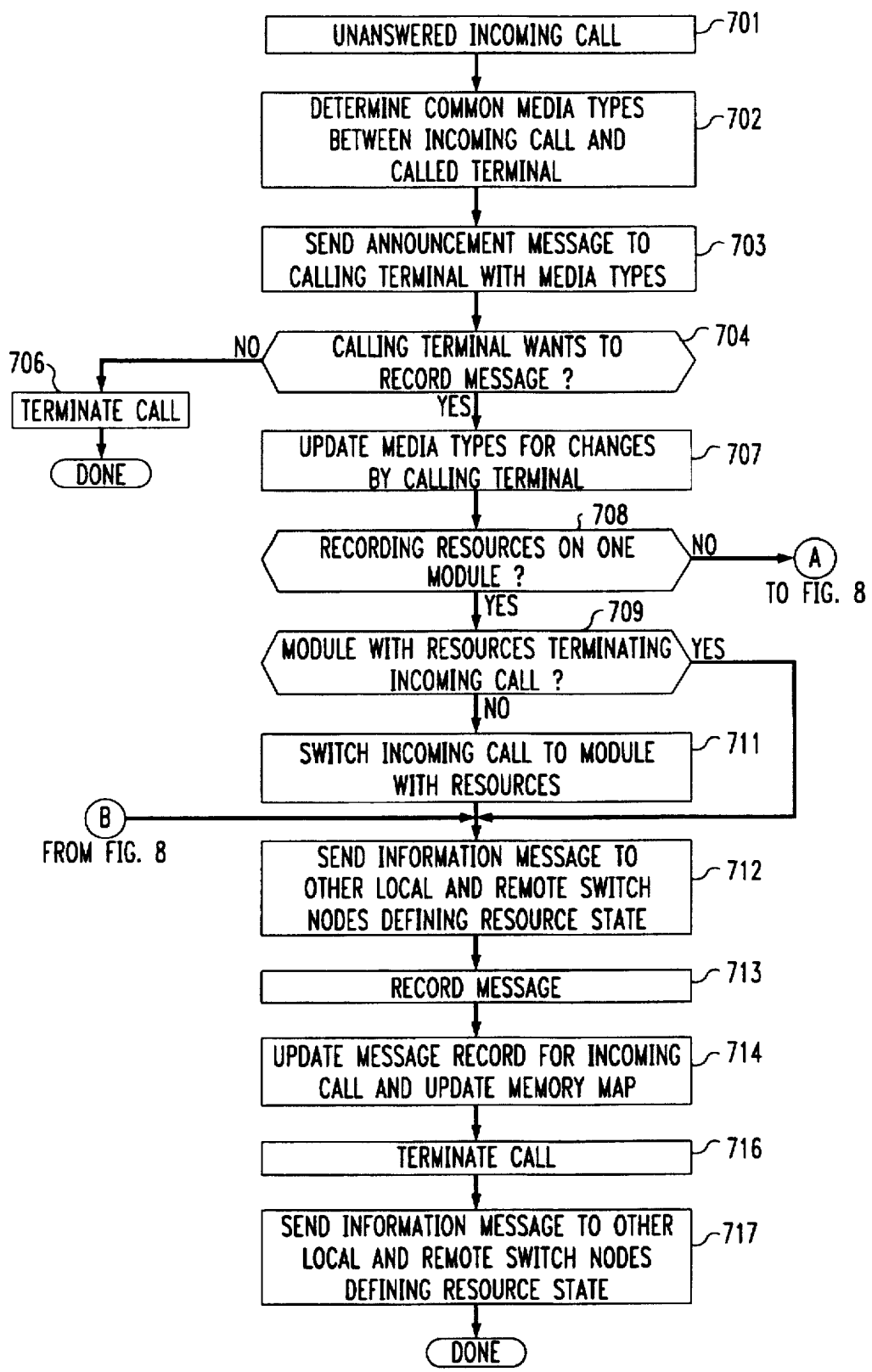
FIGS. 7, 8, and 9 illustrate, in flow chart form, the operations performed to store a message for an unanswered incoming call.

Consider now in greater detail the functions performed by switch nodes in storing a message for an unanswered incoming call. Initially, FIG. 7 responds to the unanswered incoming call in block 701 to transfer control to block 702. The latter block determines the common media types between what is specified in the incoming call and the media capabilities of the called terminal. Block 703 then sends an announcement message to the calling terminal specifying what the available media types are. Decision block 704 waits for a response from the calling party indicating whether or not they want to record a message. If the calling process does not want to record a message, control is transferred to block 706 which terminates the call. If the calling party does wish to leave a message, the calling party is free to change the media types for the message versus the original call. For example, the calling party may only wish to leave a voice message even though the original call included video. Block 707 determines which media types are to be used and transfers control to decision block 708. The latter decision block determines whether the necessary recording resources are present on one module within the switch node. If the answer is yes, control is transferred to decision block 709 which determines if the module with the recording resources is presently terminating the incoming call. If the answer is yes, control is transferred to block 712. If the answer in decision block 709 is no, control is transferred to block 711. The latter block transfers the incoming call from the initial received module to the module that has the recording resources and transfers control to block 712.

Each switch node in the system of FIG. 2 places the other switch nodes of the system into one of three categories. For example, switch node 201 places switch nodes 202 and 203 in a local category since switch node 201 has a direct link to each of these switch nodes. Switch node 201 places switch nodes 204 and 205 into the remote category since switch node 201 has to be interconnected to each of these switch nodes via another switch node. The third category which is not illustrated in FIG. 2 would be if switch node 201 was interconnected to another switch node via the public telephone network. Returning to FIG. 7, block 712 sends an information message to the local and remote switch nodes defining that the resource state of the switch node recording the message for the incoming call has changed. Each switch node maintains a table that defines the resource state of the connected local and remote switch nodes. Block 713 records and stores the message. Block 714 updates the message record of FIG. 5 and updates the memory map of FIG. 6. The state of the message in column 503 is set to unread, and the pre-record flag in column 504 is reset. Block 716 terminates the call, and block 717 sends an information message to the other local and remote switch nodes defining the change in resource state of the recording switch node. This message is defining the amount of storage that was used in recording the message; whereas, the message transmitted in block 712 informed the other switch nodes of the fact that a DSP was currently being utilized in the recording switch node.

Figure 8:
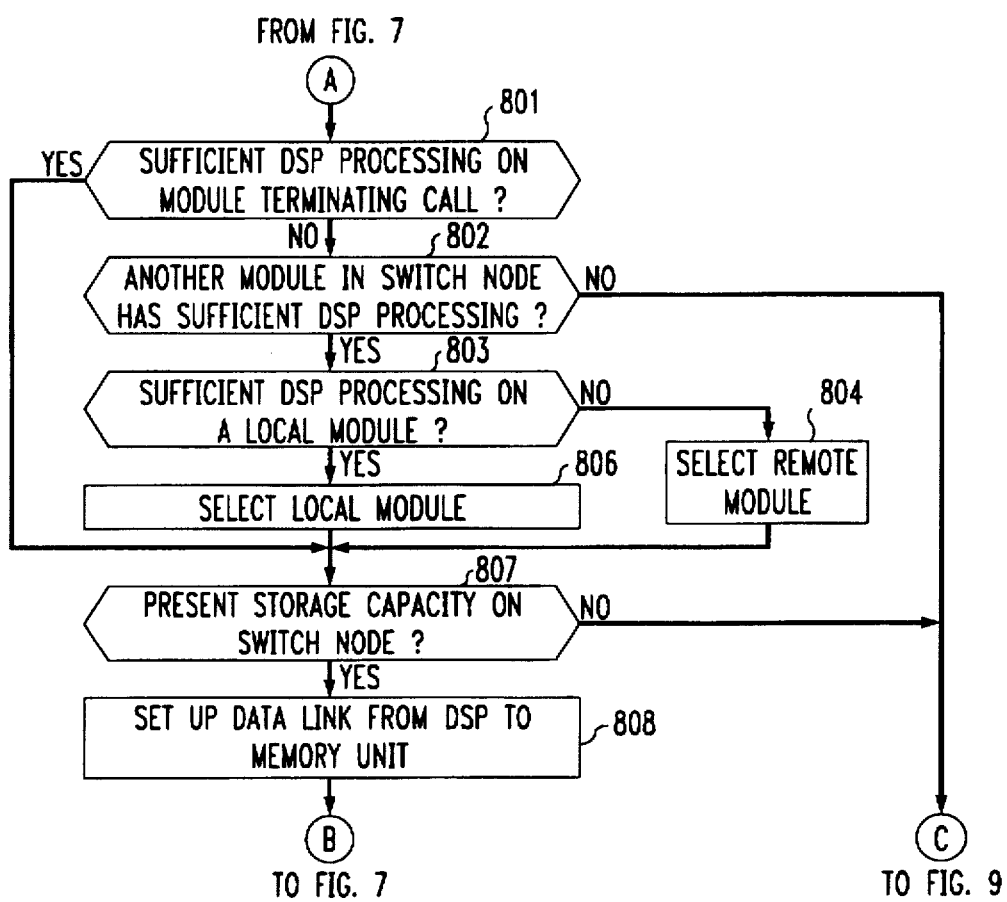

Returning to decision block 708, if the resources are not found within one module, control is transferred to decision block 801 of FIG. 8. Blocks 801–808 of FIG. 8 attempt to identify a DSP on one module that has sufficient processing power to process the message and to find a memory unit on another module that has the present storage capacity to store the message. Decision block 801 determines if the DSP in the module that is terminating the call has sufficient processing power. If the answer is yes, control is transferred to decision block 807. If the answer is no in decision block 801, control is transferred to decision block 802 which determines if there is another module that has a DSP that has sufficient processing capabilities. If the answer is yes in decision block 802, decision block 803 determines if there is a DSP in a local module that can be utilized. If the answer is yes, block 806 selects the local module. If the decision in decision block 803 is no, block 804 selects the remote module. Decision block 807 determines whether any memory unit within the switch node has the present storage capacity to store the message. If the answer is yes, block 808 sets up data link between the selected DSP and the select memory unit. Control is then transferred to block 712 of FIG. 7 whose operations have already been described.

Figure 9:
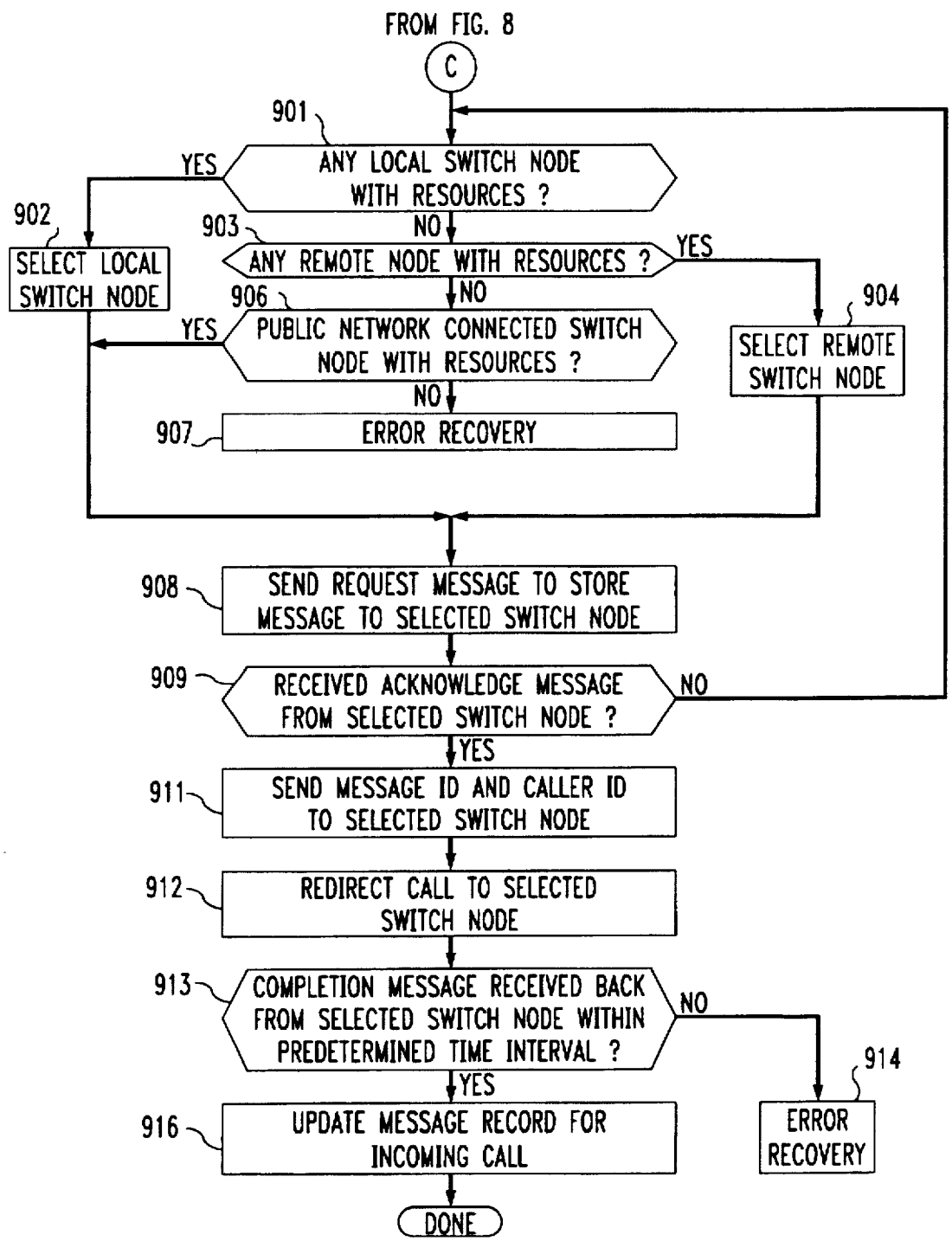

If the answer in either decision block 802 or decision block 807 is no, control is transferred to decision block 901 of FIG. 9. Blocks 901–917 of FIG. 9 are involved with selecting a switch node to store the message for the incoming call by the switch node that initially received the incoming call but does not have the resources to record a message. Decision block 901 determines if any of the local switch nodes has the necessary resources. If the answer is yes, control is transferred to block 902 which selects a local switch node. The selected local switch node is the one having the largest amount of present storage capacity. If the answer is no in decision block 901, control is transferred to decision block 903 which determines if any remote nodes have the resources. These determinations are based on the resource table which contains the apparent resources of the remote and local nodes. Each switch node maintains its own resource table. Entries are made in the resource table in response to information messages received from other switch nodes defining the resource state of the sending switch node. If the answer in decision block 903 is yes, control is transferred to block 904 which selects a remote switch node. The selected remote switch node is the one having the largest amount of present storage capacity. If the answer in decision block 903 is no, control is transferred to decision block 906 to see if any switch node that is connected via the public network is known to have the necessary resources. If the answer is no, block 907 performs error recovery. If the answer in decision block 906 is yes, a public network connected switch node is selected and control is transferred to block 908.

Block 908 sends a request message to the selected switch node requesting that the selected switch node store the message. In response to the request message, the selected switch node can transmit an acknowledge message back indicating that it will store the message, or the selected switch node can transmit back a rejection message. After execution of block 908, decision block 909 determines if an acknowledge message was received back from the selected switch node. If the answer is no, control is once again transferred back to decision block 901. The messaging manager application also updates the resource table to redefine the available resources of the previously selected switch node. If the answer is yes in decision block 909, block 911 sends the message identification code and the identification of the caller to the selected switch node. Block 912 then redirects the incoming call to the select switch node and defines in the redirect message that a multimedia message is to be recorded. Decision block 913 then determines if a completion message is received back from the selected switch node within a predetermined time interval. If the answer is no, block 914 does error recovery. If the answer is yes, block 916 updates the message record for the message by inserting the storage switch node number, state of the message, resetting the pre-record flag, inserting the media types, and updating the table pointed to by the header pointer. Note, that the selected switch node that stored the message will include the message in its memory map as illustrated in FIG. 6.

Figure 10:
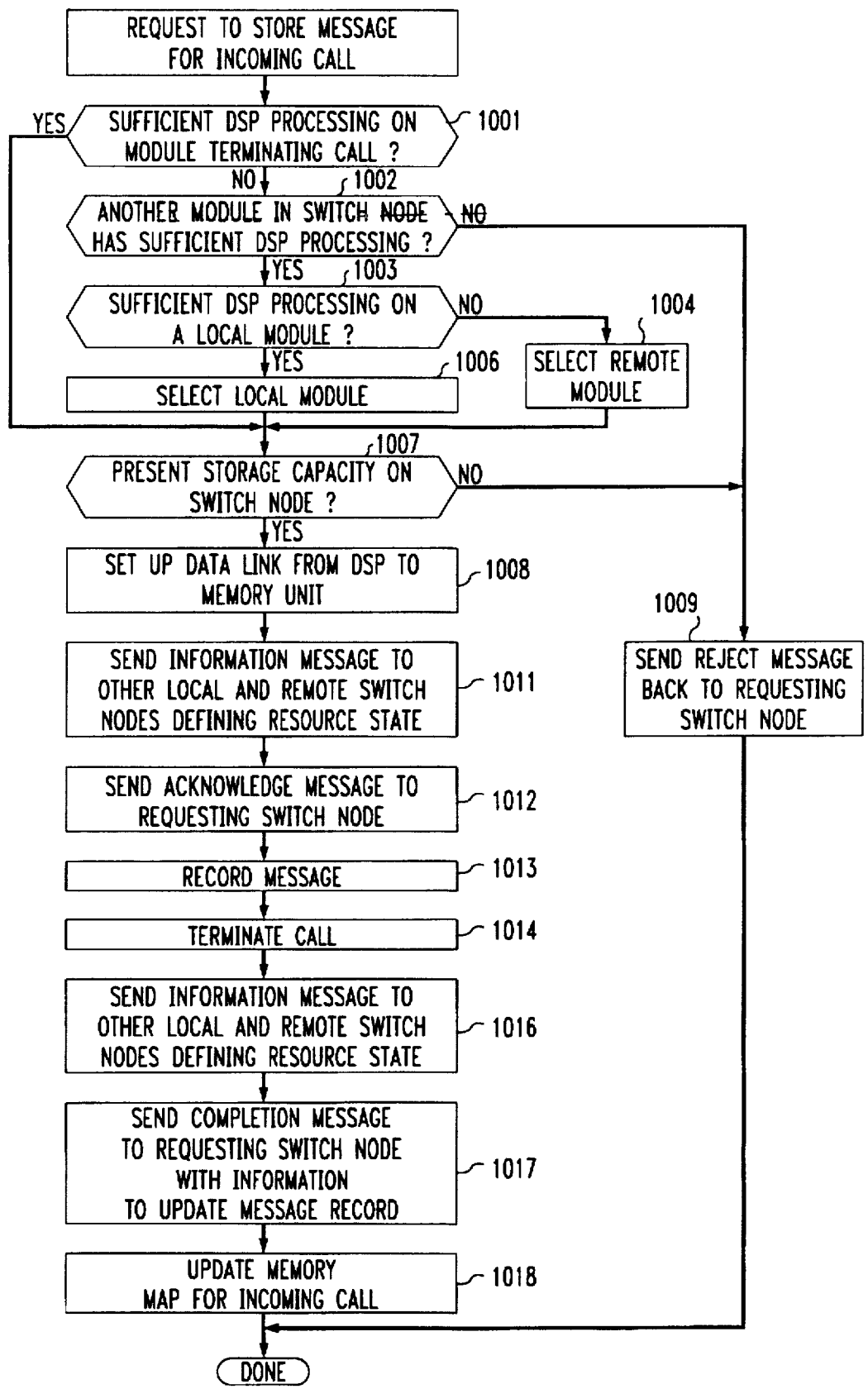
FIG. 10 illustrates, in flow chart form, the operations performed by a storing switch node in response to a request from a switch node controlling the recording of a message.

FIG. 10 illustrates in greater detail the operations performed by a messaging manager application when a request is received from another switch node to store a message for an incoming call. Decision block 1001 determines if there is sufficient DSP processing power on the module terminating the call to handle the recording of the message. If the answer is no, decision block 1002 determines if there is another module in the switch node that has sufficient DSP processing power. If the answer is no in decision block 1002, control is transferred to block 1009 which sends back a rejection message to the requesting switch node. If the answer is yes in decision block 1002, decision block 1003 determines if a local module has sufficient DSP processing. If the answer is yes, block 1006 selects a local module. If the answer is no, block 1004 selects a remote module.

Block 1007 determines if there is present storage capacity on the switch node to store the message for the incoming call. If the answer is no, control is transferred to block 1009 which was previously described. If the answer is yes in decision block 1007, block 1008 sets up a data link between the selected DSP and a selected memory unit. After execution of block 1008, block 1011 sends an information message to its local and remote switch nodes defining the change in resource state of the switch node. Block 1012 sends an acknowledgment message to the requesting switch node. Block 1013 records the message, and block 1014 terminates the call after the message has been recorded. Block 1016 uses an information message to update the local and remote switch nodes of the recording switch node as to its resource state. Block 1017 sends a completion message back to the requesting switch node with information to update columns 502, 503, 505, and 506 of FIG. 5. Finally, block 1018 updates the memory map of the storing switch node by inserting information into columns 601, 602, 603, and 604 of FIG. 6.

Figure 11:
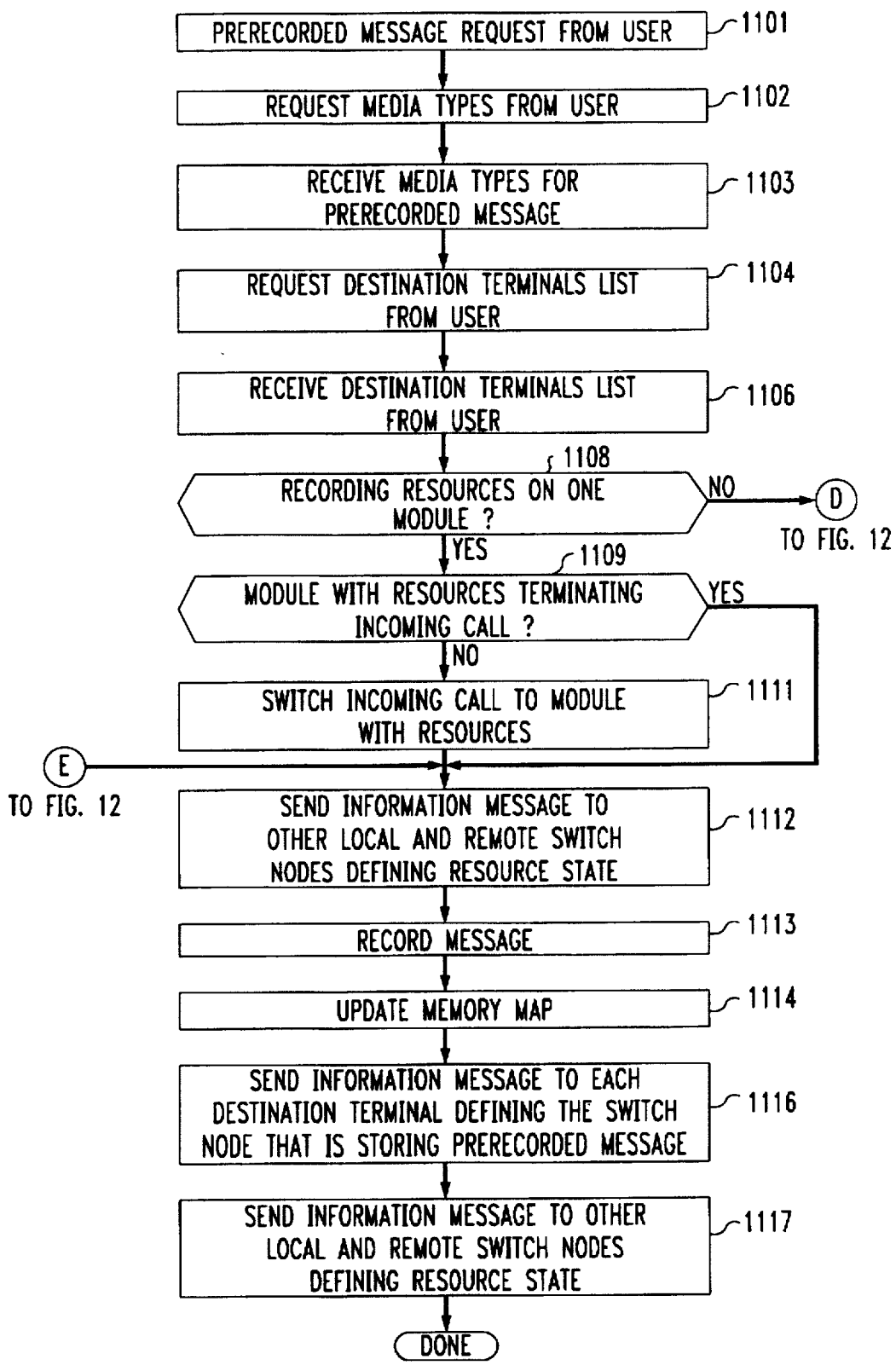
FIGS. 11, 12, and 13 illustrate, in flow chart form, the operations performed by a switch node in controlling the recording of a pre-recorded message.
Figure 12:
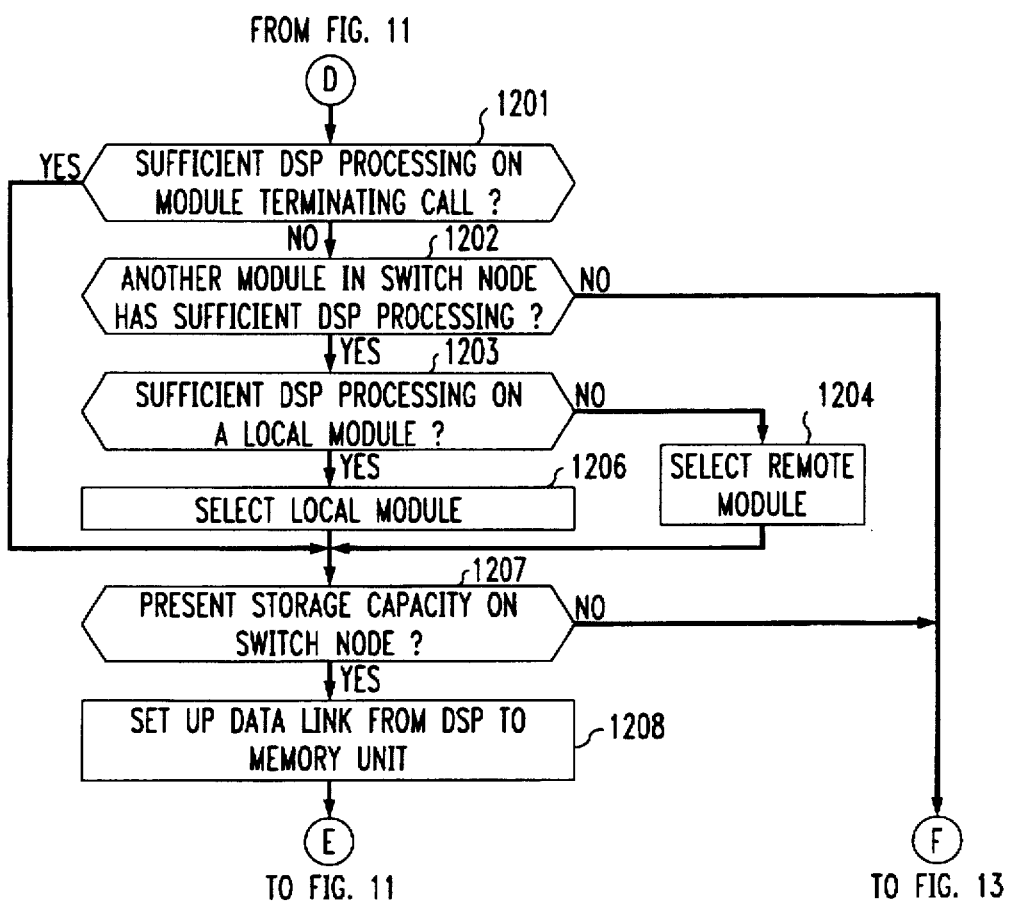
Figure 13:
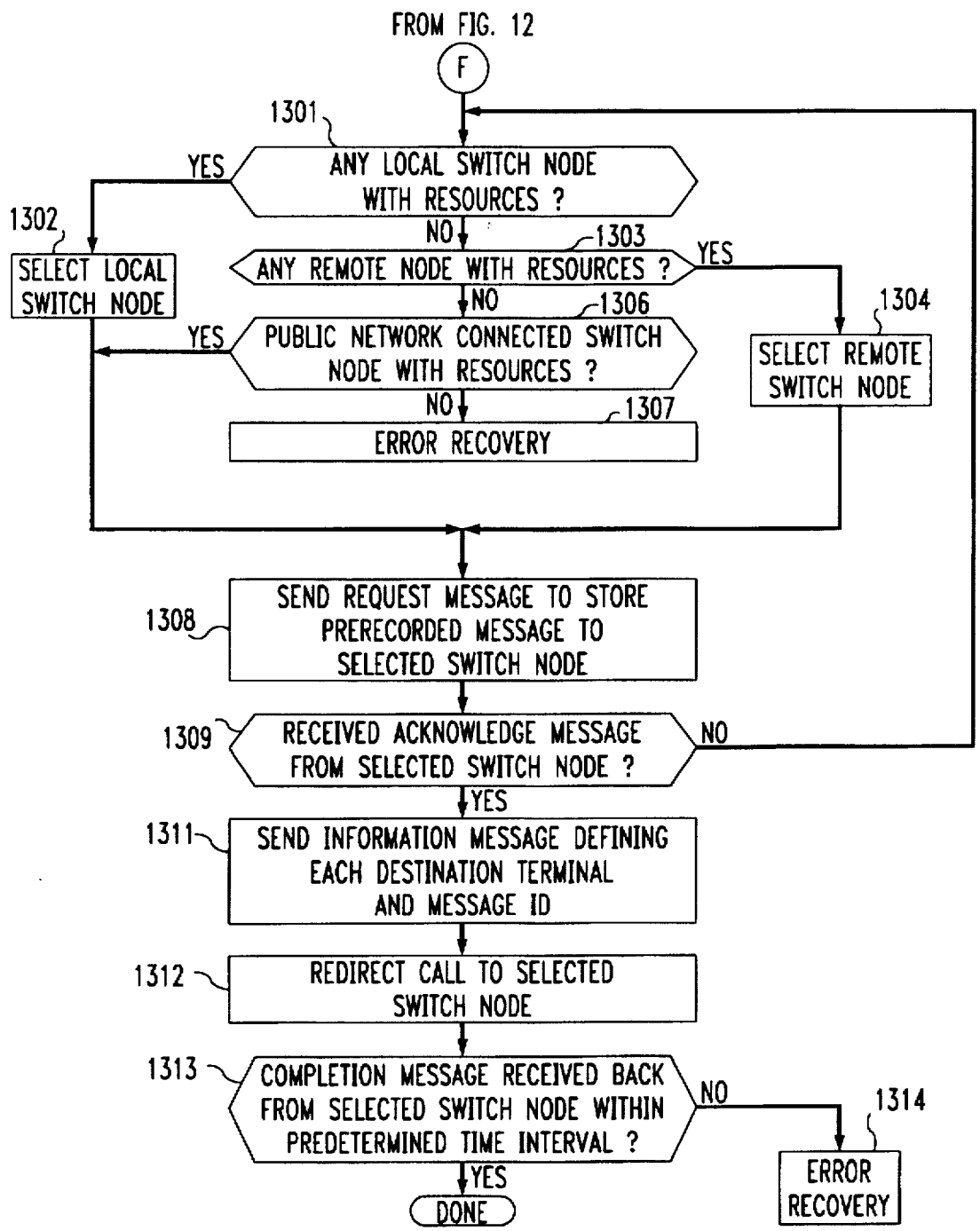

FIGS. 11, 12, and 13 illustrate the operations performed by a switch node in responding to a request from a user to record a pre-recorded message. Block 1101 determines that the user wants to pre-record a message. Block 1102 requests that the media types to be utilized for the pre-recorded be entered by the user, and block 1103 receives these media types from the user. Block 1104 then requests that the user enter the identification of the destination terminals, and 1106 receives this destination terminal information. Decision block 1108 determines whether the recording resources are on one module. If the answer is no, control is transferred to decision block 1201 of FIG. 12. If the answer is yes in decision block 1108, decision block 1109 determines if the module with the resources is the module that is presently terminating the incoming call. If the answer is yes, control is transferred to block 1112. If the answer is no in decision block 1109, block 1111 switches the incoming call to the module with the resources. Block 1112 informs the other local and remote switch nodes that the recording switch node is presently utilizing storage capacity and DSP processing capacity. Block 1113 records the message. Block 1114 updates the memory map of the recording switch node. The message record is not updated in the recording switch node. Within the memory map, columns 601, 602, and 603 are entered in the normal fashion. The number of destination terminals is entered into column 604. Block 1116 sends an information message to each of the destination terminals defining that a pre-recorded message is stored on the switch node. The information message includes the information for columns 501–505 for the message record of each destination terminal. In addition, the information message includes header information that is stored by the messaging manager application of the home switching node. The messaging manager application properly updates the header pointer column. Finally, block 1117 updates the resource state information on the other local and remote switch nodes.

Returning to decision block 1108, if the resources are not found within one module, control is transferred to decision block 1201 of FIG. 12. Blocks 1201–1208 of FIG. 12 attempt to identify a DSP on one module that has sufficient processing power to process the message and to find a memory unit on another module that has the present storage capacity to store the message. Decision block 1201 determines if the DSP in the module that is terminating the call has sufficient processing power. If the answer is yes, control is transferred to decision block 1207. If the answer is no in decision block 1201, control is transferred to decision block 1202 which determines if there is another module that has a DSP that has sufficient processing capabilities. If the answer is yes in decision block 1202, decision block 1203 determines if there is a DSP in a local module that can be utilized. If the answer is yes, block 1206 selects the local module. If the decision in decision block 1203 is no, block 1204 selects the remote module. Decision block 1207 determines whether any memory unit within the switch node has the present storage capacity to store the message. If the answer is yes, block 1208 sets up data link between the selected DSP and the select memory unit. Control is then transferred to block 1112 of FIG. 11 whose operations have already been described.

If the answer in either decision block 1202 or decision block 1207 is no, control is transferred to decision block 1301 of FIG. 13. Blocks 1301–1317 of FIG. 13 are involved with selecting a switch node to store the message for the incoming call by the switch node that initially received the incoming call but does not have the resources to record a message. Decision block 1301 determines if any of the local switch nodes has the necessary resources. If the answer is yes, control is transferred to block 1302 which selects a local switch node. The selected local switch node is the one having the largest amount of present storage capacity. If the answer is no in decision block 1301, control is transferred to decision block 1303 which determines if any remote nodes have the resources. These determinations are based on the resource table which contains the apparent resources of the remote and local nodes. Each switch node maintains its own resource table. Entries are made in the resource table in response to information messages received from other switch nodes defining the resource state of the sending switch node. If the answer in decision block 1303 is yes, control is transferred to block 1304 which selects a remote switch node. The selected remote switch node is the one having the largest amount of present storage capacity. If the answer in decision block 1303 is no, control is transferred to decision block 1306 to see if any switch node that is connected via the public network is known to have the necessary resources. If the answer is no, block 1307 performs error recovery. If the answer in decision block 1306 is yes, a public network connected switch node is selected and control is transferred to block 1308.

Block 1308 sends a request message to the selected switch node requesting that the selected switch node store the message. In response to the request message, the selected switch node can transmit an acknowledge message back indicating that it will store the message, or the selected switch node can transmit back a rejection message. After execution of block 1308, decision block 1309 determines if an acknowledge message was received back from the selected switch node. If the answer is no, control is once again transferred back to decision block 1301. The messaging manager application also updates the resource table to redefine the available resources of the previously selected switch node. If the answer is yes in decision block 1309, block 1311 sends the message identification code and the identification of each destination terminal to the selected switch node. Block 1312 then redirects the incoming call to the select switch node and defines in the redirect message that a multimedia message is to be recorded. Decision block 1313 then determines if a completion message is received back from the selected switch node within a predetermined time interval. If the answer is no, block 1314 does error recovery. If the answer is yes, the operations are done. Note, that the selected switch node that stored the message will include the message in its memory map as illustrated in FIG. 6.

Figure 14:
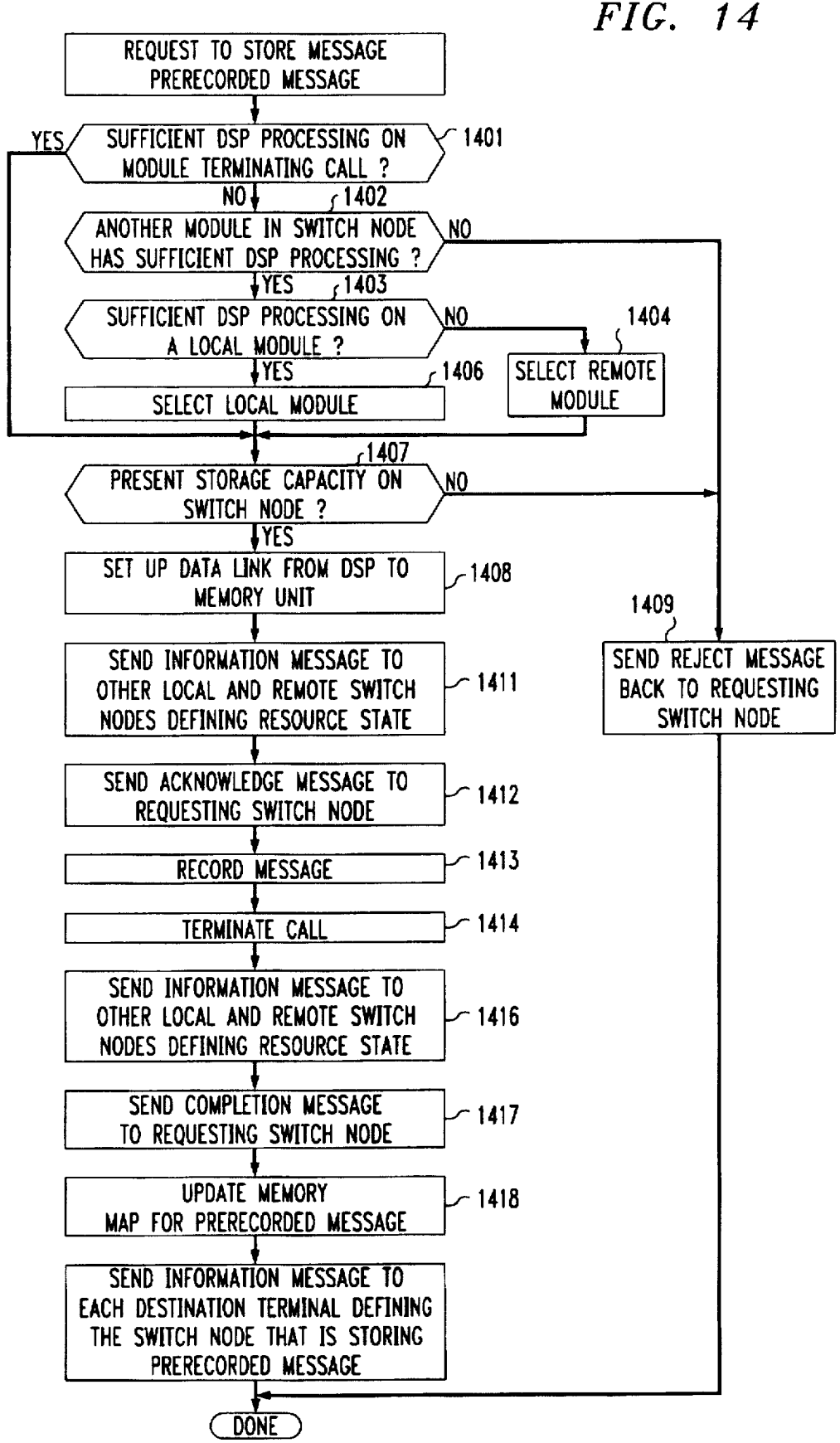
FIG. 14 illustrates, in flow chart form, the operations performed by a switch node storing a pre-recorded message as requested by the switch node controlling the pre-recording of the message.

FIG. 14 illustrates in greater detail the operations performed by a messaging manager application when a request is received from another switch node to store a message for a pre-recorded message. Decision block 1401 determines if there is sufficient DSP processing power on the module terminating the call to handle the recording of the message. If the answer is no, decision block 1402 determines if there is another module in the switch node that has sufficient DSP processing power. If the answer is no in decision block 1402, control is transferred to block 1409 which sends back a rejection message to the requesting switch node. If the answer is yes in decision block 1402, decision block 1403 determines if a local module has sufficient DSP processing. If the answer is yes, block 1406 selects a local module. If the answer is no, block 1404 selects a remote module.

Block 1407 determines if there is present storage capacity on the switch node to store the message for the incoming call. If the answer is no, control is transferred to block 1409 which was previously described. If the answer is yes in decision block 1407, block 1408 sets up a data link between the selected DSP and a selected memory unit. After execution of block 1408, block 1411 sends an information message to its local and remote switch nodes defining the change in resource state of the switch node. Block 1412 sends an acknowledgment message to the requesting switch node. Block 1413 records the message, and block 1414 terminates the call after the message has been recorded. Block 1416 uses an information message to update the local and remote switch nodes of the recording switch node as to its resource state. Block 1417 sends a completion message back to the requesting switch node. Finally, block 1418 updates the memory map of the storing switch node by inserting information into columns 601, 602, 603, and 604 of FIG. 6. In particular, block 1418 inserts the number of destination terminals into the pre-record count field of column 604. Finally, block 1419 sends an information message to each of the destination terminals identifying the switch node upon which the pre-recorded message is stored.

Figure 15:
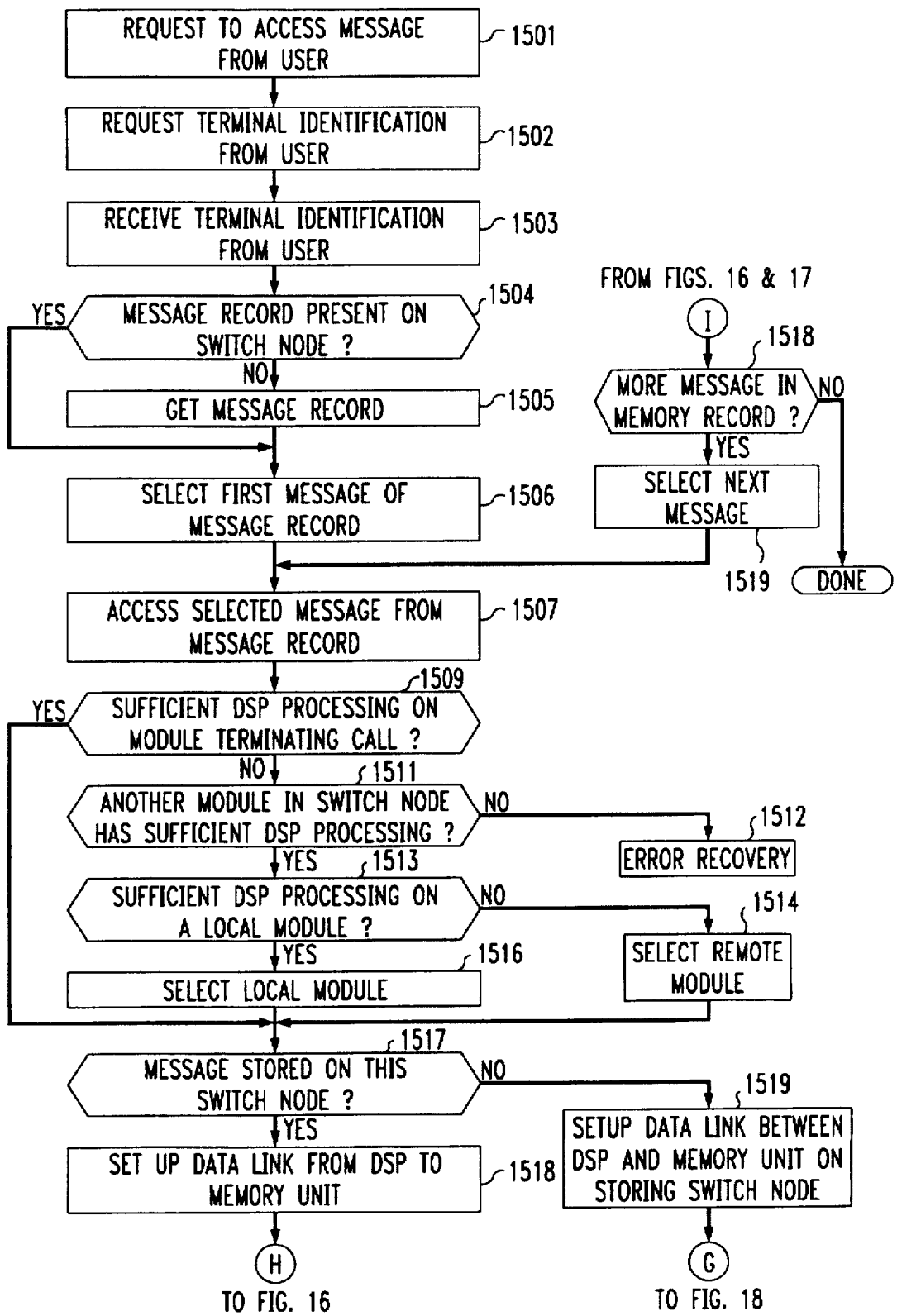
FIGS. 15, 16, 17, 18, and 19 illustrate, in flow chart form, the operations performed by a switch node controlling a playback session.
Figure 16:
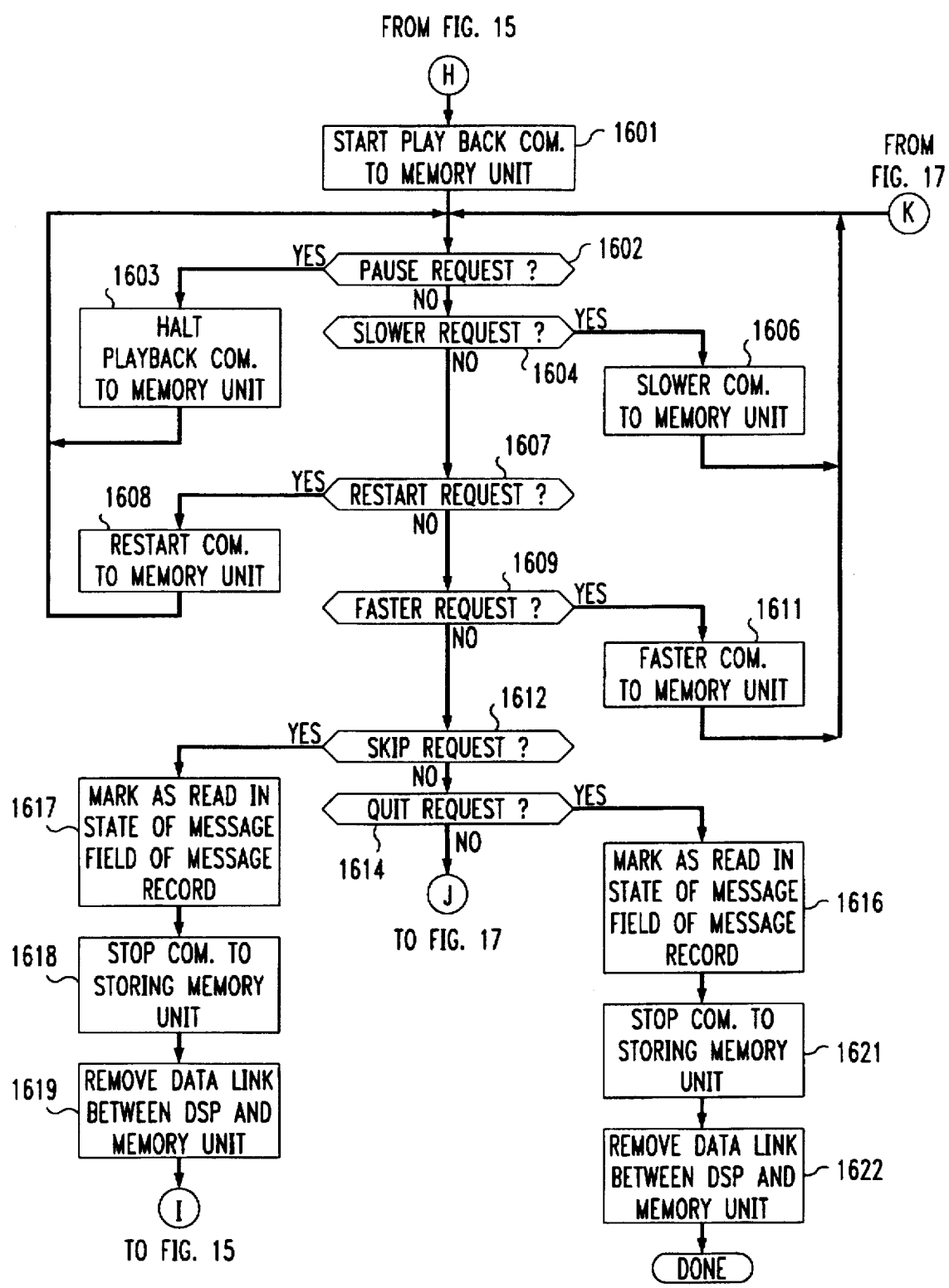
Figure 17:
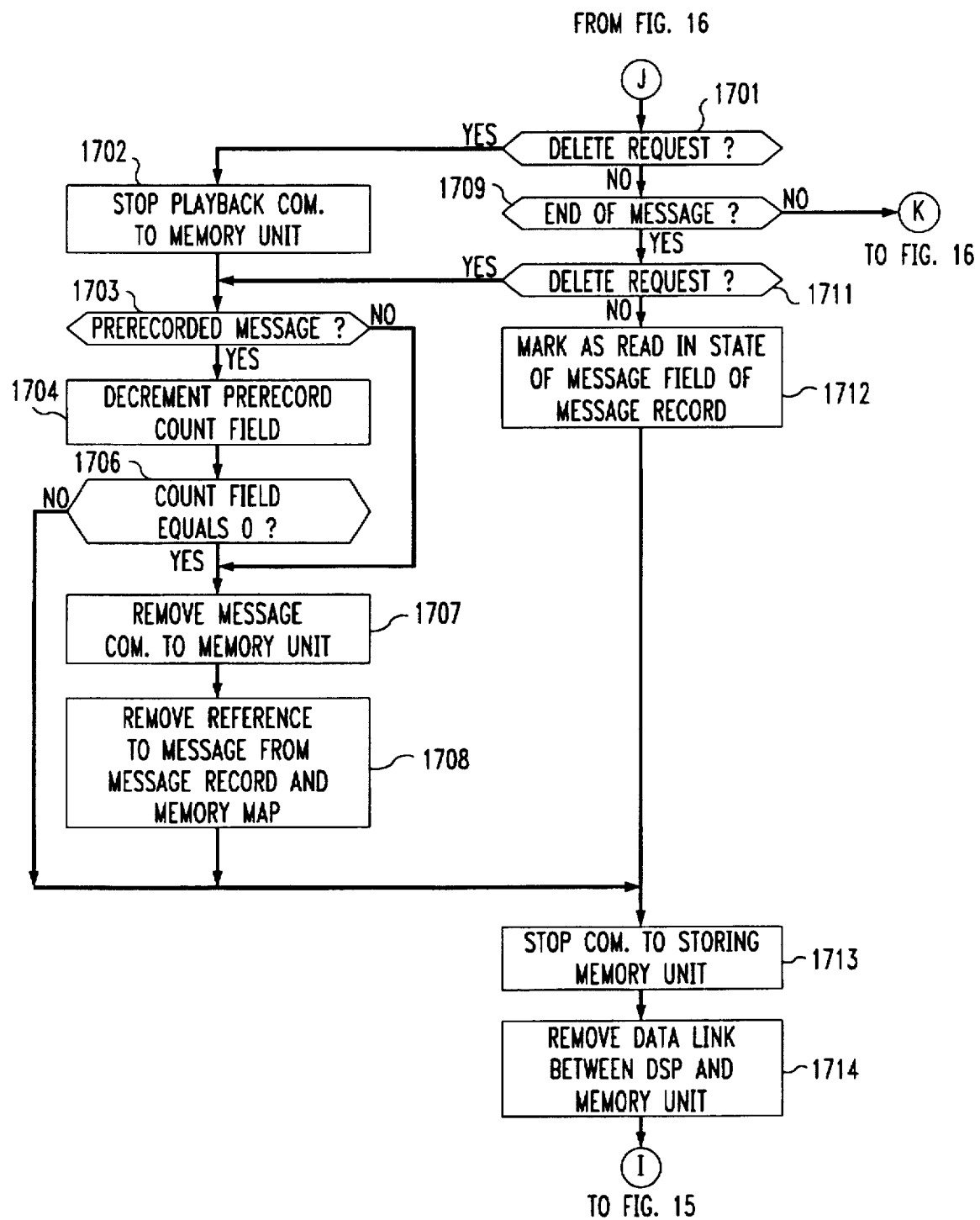

FIGS. 15, 16, and 17 illustrate that the operations performed by messaging manager application of a switching node in accessing messages stored for a particular terminal. These operations are referred to as a playback session. Block 1501 detects request to access messages from a user. Block 1502 requests from the user the terminal identification whose messages are being accessed, and block 1502 receives the terminal identification from the user. Decision block 1504 determines if the message record for the identified terminal are present on the switch node. If the answer is yes, control is transferred to block 1506. However, if the answer in decision block 1504 is no, block 1505 gets the message record from the home switch node of the identified terminal on the basis of the terminal identification. Block 1506 selects the first message of the message record. If there are no messages in the record, block 1506 terminates the playback session. If there is at least one message, block 1507 accesses the selected message from the message record.

Blocks 1509–1516 ascertain whether or not there is sufficient DSP processing on the switch node to playback messages stored either on this switch node or on other switch nodes. Decision block 1509 determines if the DSP on the module terminating the call for accessing messages has sufficient processing power. If it does, control is transferred to block 1517. If the answer is no, decision block 1509, control is transferred to decision block 1511. The latter decision block determines if there is another module within the switch node that has sufficient DSP processing power. If the answer is no, control is transferred to block 1512 for error recovery since the messaging manager application of the switch node should always maintain sufficient DSP processing for playing back messages. However, one skilled in the art could readily see that rather than performing error recovery in block 1512, that another switch node could be identified that had sufficient DSP processing capabilities to playback the messages. The message record would be transferred to the identified switch node which would then perform the playback session.

Assuming that the answer in decision block 1511 is yes, decision block 1513 determines if there is a DSP in a local module that can perform the processing. If the answer is yes, block 1516 selects the local module. If the answer in decision block 1513 is no, block 1514 selects a remote module. Decision block 1517 determines if the selected message is stored on this switch node. If the answer is yes, block 1518 sets up a data link from the selected DSP to the memory unit storing the selected message. Control is then transferred to block 1601 of FIG. 16. Returning to decision block 1517, if the answer is no, block 1519 sets up a data link between the selected DSP and the memory unit on the storing switch node. Block 1519 involves communication between the messaging manager application of this switch node and the messaging manager application of the storing switch node. After execution of block 1519, control is transferred to block 1801 of FIG. 18.

Turning to block 1601 of FIG. 16, this block sends a start playback command to the memory unit. This command includes the storage address taken from column 603 of the messaging entry in the memory map of FIG. 6. FIGS. 16 and 17 are concerning with responding to requests that the user makes during the playback session. Decision block 1602 determines if a pause request had been received from the user. If the answer is yes, block 1603 sends a halt playback command to the memory unit and returns control to decision block 1602. If the answer in decision block 1602 is no, decision block 1604 determines if a slower request was received from the user. If the answer is yes, block 1606 transmits a slower command to the memory unit and returns control to decision block 1602. If the answer is no in decision block 1604, decision block 1607 determines if there is a restart request that results in all of the messages being replayed. If the answer is yes, block 1608 transmits a reset command to the memory unit. If the answer in decision block 1607 is no, decision block 1609 determines if the user has requested that the messages be played faster. If the answer is yes, block 1611 transmits a faster command to the memory unit and returns control to decision block 1602. If the answer in decision block 1609 is no, decision block 1612 determines if the user is requesting to skip this message. If the answer is yes, block 1617 marks the message as read. Note, the message is not deleted. After execution of block 1617, control is transferred to block 1618 which sends a stop command to the memory unit. After execution of block 1618, block 1619 removes the data link between the DSP and memory unit. After execution of block 1619, control is transferred back to block 1518 of FIG. 15. If the answer in decision block 1612 is no, decision block 1614 determines if a quit request was received from the user. If the answer is yes, control is transferred to block 1616 which marks the message as read in the state-of-the message field of the message record. Block 1621 sends a stop command to the memory unit. Finally, block 1622 removes the data link between the DSP and memory unit. If the answer in decision block 1614 is no, control is transferred to decision block 1701 of FIG. 17.

Decision block 1701 determines if the user has decided to delete a message during the actual playback of that message. If the answer in decision block 1701 is yes, block 1702 sends a stop playback command to the memory unit and transfers control to decision block 1703. Decision block 1703 checks the pre-record flag of the message record of FIG. 5 to determine if the message being played back is a pre-recorded message. If the answer is no, control is transferred to block 1707 which transmits the remove message command to the memory unit. In response to this command, the memory unit deletes the message. Block 1708 then removes all reference to the message from the message record and the memory map. After execution of block 1708, control is transferred to block 1713 which sends a stop command to the memory unit. Block 1714 then removes the data link between DSP and memory unit and transfer control back to block 1518 of FIG. 15. Decision block 1518 of FIG. 15 determines if there are any more messages in the memory record. If the answer is no, then the playback session is done. If the answer in decision block 1518 is yes, block 1519 selects the next message and transfers control to block 1507.

Returning to decision block 1703, if the answer is yes in decision block 1703, block 1704 decrements the pre-record count field of the memory map for the message that is being played back. Decision block 1706 then determines if the pre-record count field equals zero. If the answer is no, control is transferred to block 1713. If the answer is yes in decision block 1706, this means that all of the destination terminals for the pre-recorded message have accessed the message and deleted it. Hence, if the answer in decision block 1706 is yes, blocks 1707 and 1708 are executed which have already been described.

Returning to decision block 1701, if the answer is no, decision block 1709 determines if the entire message has been played back. If the answer is no, control is transferred to decision block 1602 of FIG. 16. If the answer in decision block 1709 is yes, decision block 1711 determines if the user wishes to delete that message. If the answer is yes, control is transferred to decision block 1703 whose operations have already been described. If the answer is no in decision block 1711, block 1712 marks the message as read in the state-of-the message field in the message record and transfers control to block 1713.

Figure 18:
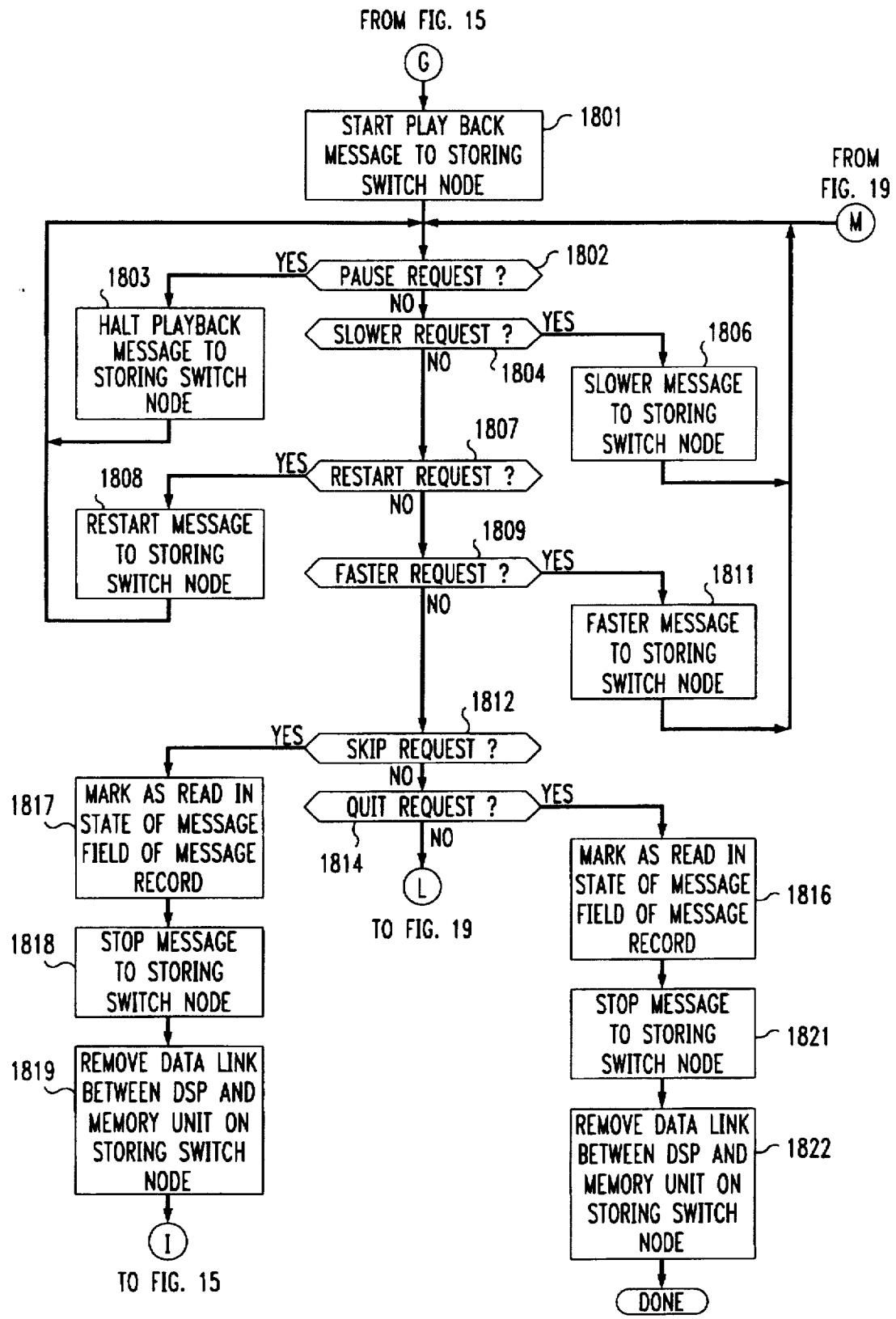
Figure 19:
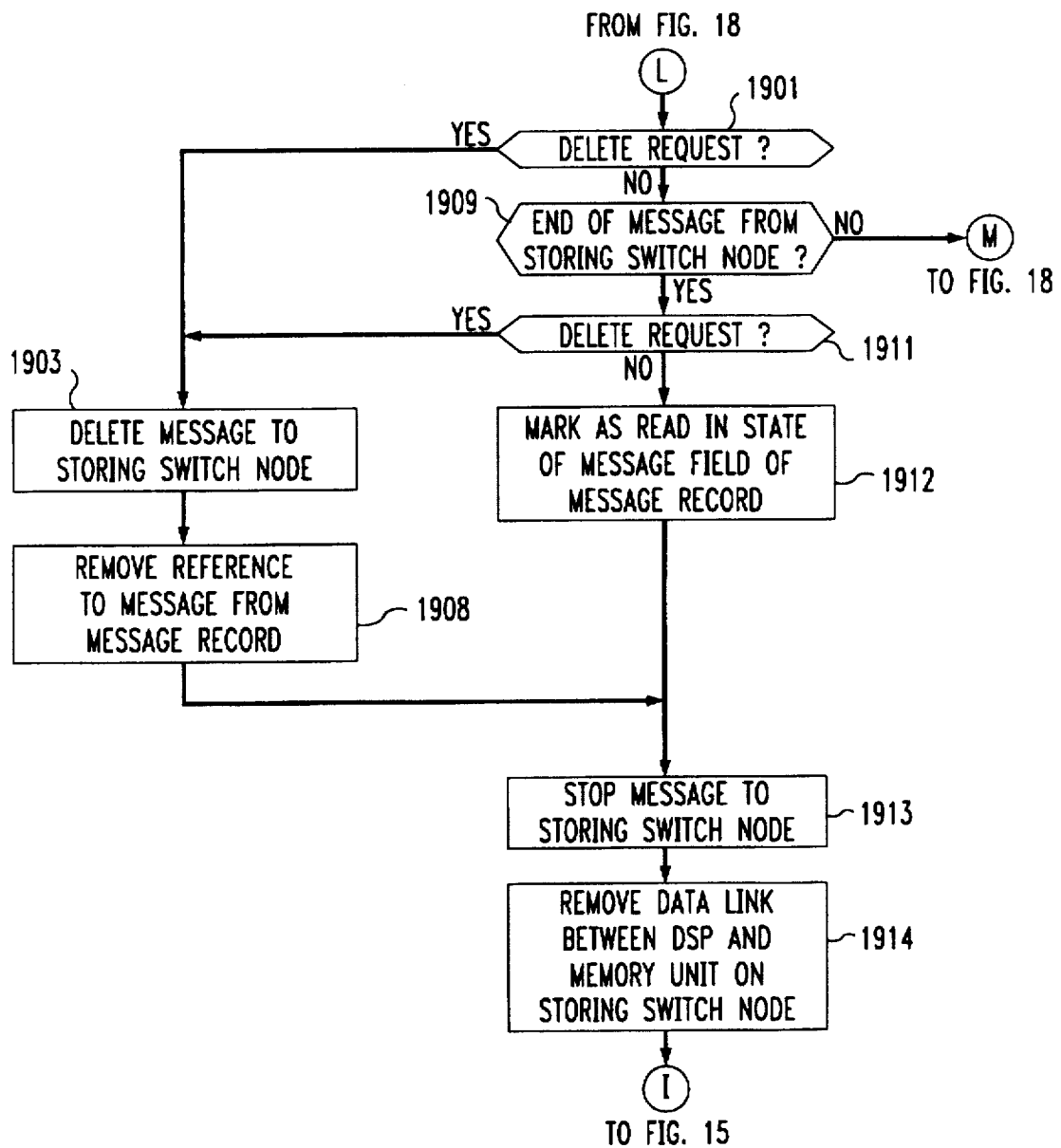

Turning to block 1801 of FIG. 18, this block sends a start playback message to the storing switch node. FIGS. 18 and 19 are concerning with responding to requests that the user makes during the playback session. Decision block 1802 determines if a pause request had been received from the user. If the answer is yes, block 1803 sends a halt playback message to the storing switch node and returns control to decision block 1802. If the answer in decision block 1802 is no, decision block 1804 determines if a slower request was received from the user. If the answer is yes, block 1806 transmits a slower message to the storing switch node and returns control to decision block 1802. If the answer is no in decision block 1804, decision block 1807 determines if there is a restart request that results in all of the messages being replayed. If the answer is yes, block 1808 transmits a reset message to the storing switch node. If the answer in decision block 1807 is no, decision block 1809 determines if the user has requested that the messages be played faster. If the answer is yes, block 1811 transmits a faster message to the storing switch node and returns control to decision block 1802. If the answer in decision block 1809 is no, decision block 1812 determines if the user is requesting to skip this message. If the answer is yes, block 1817 marks the message as read. Note, the message is not deleted. After execution of block 1817, control is transferred to block 1818 which sends a stop message to the storing switch node. After execution of block 1818, block 1819 removes the data link between the DSP and the memory unit on the storing switch node. After execution of block 1819, control is transferred back to block 1518 of FIG. 15. If the answer in decision block 1812 is no, decision block 1814 determines if a quit request was received from the user. If the answer is yes, control is transferred to block 1816 which marks the message as read in the state-of-the message field of the message record. Block 1821 sends a stop message to the storing switch node. Finally, block 1822 removes the data link between the DSP and the memory unit of the storing switch node. If the answer in decision block 1814 is no, control is transferred to decision block 1901 of FIG. 19.

Decision block 1901 determines if the user has decided to delete a message during the actual playback of that message. If the answer in decision block 1901 is yes, block 1901 transfers control to block 1903 which send a delete message to the storing switch node. Control is then transferred to block 1908 which removes all reference to the message from the message record. After execution of block 1908, control is transferred to block 1913 which sends a stop message to the storing switch node. Block 1914 then removes the data link between DSP and the memory unit on the storing switch node. Block 1914 transfers control back to block 1518 of FIG. 15. Decision block 1518 of FIG. 15 determines if there are any more messages in the memory record. If the answer is no, then the playback session is done. If the answer in decision block 1518 is yes, block 1519 selects the next message and transfers control to block 1507.

Returning to decision block 1901, if the answer is no, decision block 1909 determines if the entire message has been played back. If the answer is no, control is transferred to decision block 1802 of FIG. 18. If the answer in decision block 1909 is yes, decision block 1911 determines if the user wishes to delete that message. If the answer is yes, control is transferred to decision block 1903 whose operations have already been described. If the answer is no in decision block 1911, block 1912 marks the message as read in the state-of-the message field in the message record and transfers control to block 1913 whose operations have already been described.

Figure 20:
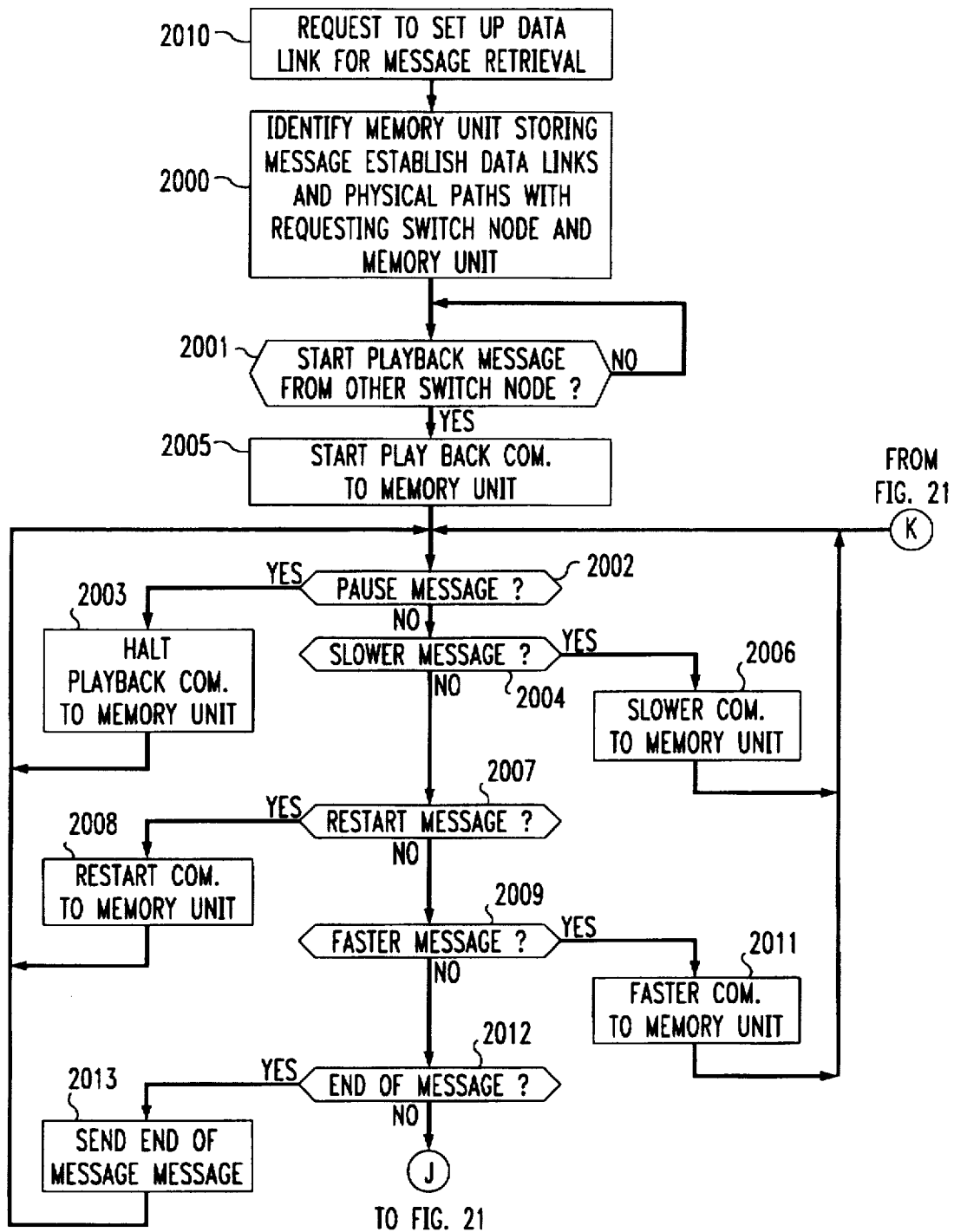
FIGS. 20 and 21 illustrate, in flow chart form, the operations performed by a storing switch node in response to messages from the switch node processing a playback session.
Figure 21:
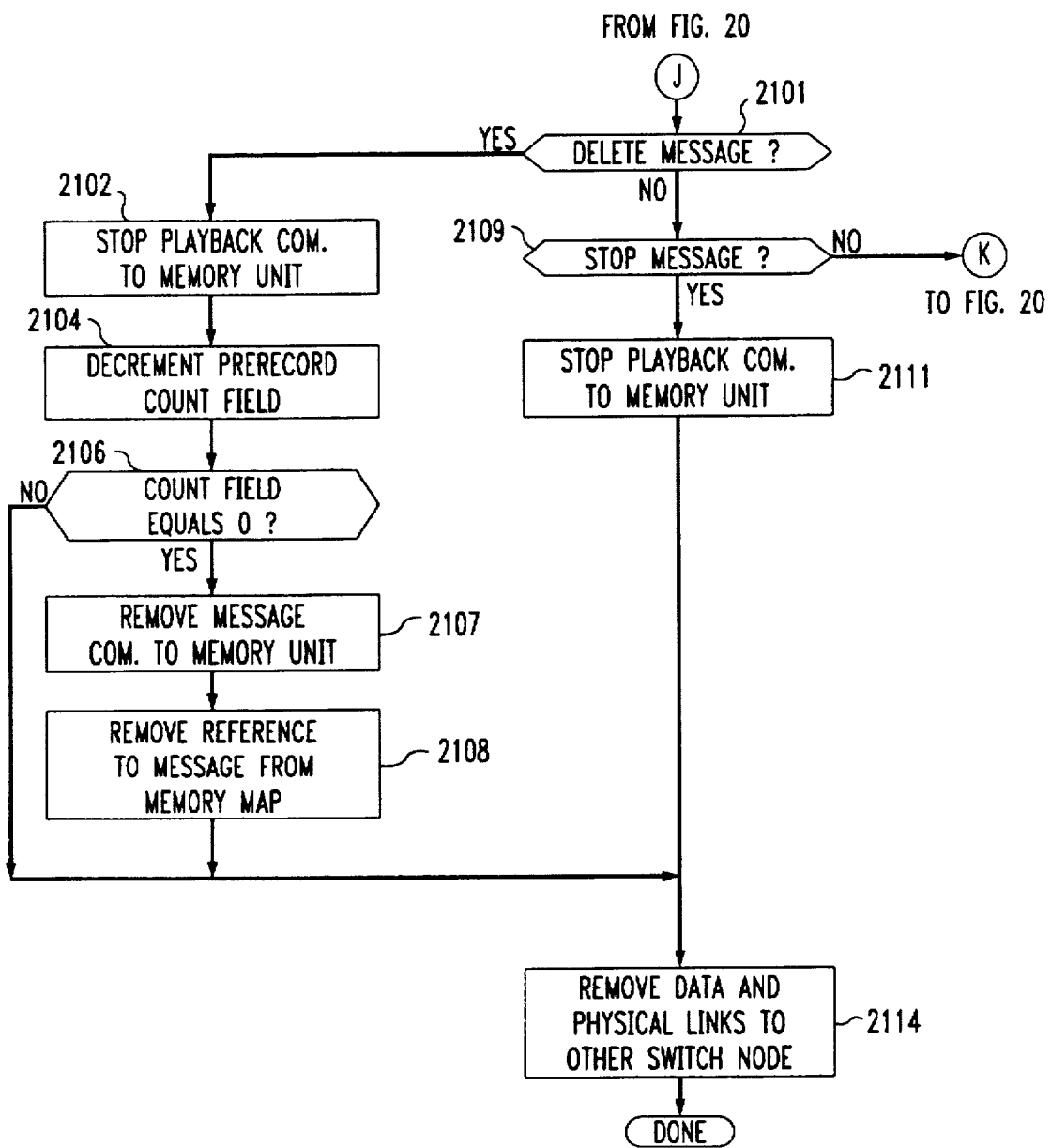

FIGS. 20 and 21 illustrate the operations performed by a storing switch node that is receiving commands from another switch node that has the message record and is controlling the playback session. The operations illustrated in FIGS. 20 and 21 are performed by the messaging manager application, and the data is being transferred to the switch node controlling the playback session as compressed digital data. The request to set up a data link for message retrieval is in response to the message transmitted in block 1519 of FIG. 15 by the switch node controlling the playback session. The playback switch node transmits the message upon determining that a message is stored in another switch node. Block 2000 identifies the memory unit storing the message. This identification is done on the basis of the message identification code transferred by block 1519 of FIG. 15. Block 2000 also establishes the necessary data links and physical paths with the requesting switch node and the memory unit as well as between the two messaging manager applications. Decision block 2001 waits for the start playback message from the other switch node. When this start playback message is received, block 2005 transmits a start playback command to the memory unit, and the memory unit commences to send the message as digital data. Control is then transferred to decision block 2002 which determines if a pause message was received. If the answer is yes, block 2003 transmits a halt playback command to the memory unit. If the answer in decision block 2002 is no, decision block 2004 determines if a slower message was received from the switch node controlling the playback session. If the answer is yes, control is transferred to block 2006 which transmits the slower command to the memory unit. If the answer in decision block 2004 is no, decision block 2007 determines if a restart message was received from the switch node controlling the playback session. If the answer is yes, block 2008 transmits a restart command to the memory unit. If the answer in decision block 2007 is no, decision block 2009 determines if a faster message was received. If the answer is yes, block 2011 transmits the faster command to the memory unit. If the answer in decision block 2009 was no, decision block 2012 determines if the memory unit has finished transferring the message to the switch node controlling the playback session. If the answer is yes, block 2013 transmits an end-of-message message to the switch node controlling the playback session. If the answer in decision block 2012 is no, control is transferred to decision block 2101. The latter decision block determines if a delete message was received. If the answer is yes, block 2102 sends a stop playback command to the memory unit. Block 2104 decrements the pre-record count field in the memory map, and decision block 2106 determines if the count field now equals zero. Block 2107 transmits the remove message command to the memory unit. This is done since the message was either a pre-recorded message or a message stored in response to an incoming call. If it was a pre-recorded message, the last destination terminal just accessed it. After execution of block 2107, block 2108 removes references to the message from the memory map and transfers control to block 2108. If the answer in decision block 2101 is no, decision block 2109 determines if a stop message was received. If the answer is no, control is transferred back to decision block 2002 of FIG. 20. If the answer is yes, block 2111 transmits the stop playback command to the memory unit. Upon receiving control from either decision block 2106, block 2108, or block 2111, block 2114 removes the data links and physical paths to the other switch node, and the message playback of this message is complete.

The invention claimed is:

1. A method for providing messaging service within a switching system having a plurality of switch nodes, comprising the steps of:

receiving a request to store a first message for a communication terminal by a first switch node;

determining ability to store the first message by the first switch node;

storing the first message by the first switch node in response to the step of determining indicating capability of the first switch node to store the first message;

requesting by the first switch node that a second switch node having capability store the first message in response to the step of determining indicating the first switch node incapable of storing the first message;

storing the first message by the second switch node in response to the request from the first switch node upon the first switch node being incapable of storing the first message; and transmitting by the second switch node a second message to the first switch node with the second message having information identifying the first message and the second switch node upon the second switch node storing the first message.

2. The method of claim 1 further comprises storing the identification information by the first switch node in a message record.

3. The method of claim 2 further comprises, upon the second switch node storing the first message, the steps of requesting the transfer of the first message by first switch node from the second switch node using the stored identification information upon the first switch node receiving a play back request for messages of the communication terminal; and transferring the first message to the first switch node by the second switch node in response to the step of requesting.

4. The method of claim 3 further comprises the step of playing back the first message to the communication terminal by the first switch node in response to the step of transferring the first message.

5. The method of claim 4 wherein the step of transferring the first message comprises the step of communicating the first message in partial portions to the first switch node by the second switch node.

6. The method of claim 2 further comprises, upon the second switch node storing the first message, the steps of requesting the message record from the first switch node by a third switch node upon the third switch node receiving a play back request from the communication terminal;

transmitting the message record to the third switch node by first switch node in response to the step of requesting;

requesting the transfer of the first message by third switch node from the second switch node using the stored identification information in message; and transferring the first message to the third switch node by the second switch node in response to the step of requesting.

7. The method of claim 6 further comprises the step of playing back the first message to the communication terminal by the third switch node in response to the step of transferring the first message.

8. The method of claim 7 wherein the step of transferring the first message comprises the step of communicating the first message in partial portions to the third switch node by the second switch node.

9. The method of claim 7 further comprises the steps of updating the message record by the third switch node; and transmitting the updated message record back to the first switch node by the third switch node.

10. The method of claim 1 wherein the first switch node comprises a plurality of networks with each network having a service circuit and a storage unit for storing messages and the method further comprises the steps of processing the first message in a service circuit of a network terminating the communication terminal upon a determination that the service circuit of the network terminating the communication terminal can process the first message; and storing the processed first message in a storage unit of the network terminating the communication terminal upon a determination that the storage unit of the network terminating the communication terminal can store the first message.

11. The method of claim 10 wherein the method further comprises, upon a determination that both the service circuit and the storage unit of the network terminating the communication terminal can not process and store the first message, the steps of processing the first message by a service circuit of a first one of the plurality of networks; and storing the first message in a storage unit of a second one of the plurality of networks.

12. The method of claim 1 wherein the step of receiving comprises the steps of receiving a call from another communication terminal;

reading information defining the request from the other communication terminal; and redirecting the call from the first switch node in response to the step of determining indicating the first switch node incapable of storing the first message.

13. The method of claim 1 wherein the step of requesting comprises the steps of transmitting a storing request to a one of a plurality of local switch nodes upon the one of the plurality of local switch nodes having capability to store the first message; and transmitting the storing request to one of a plurality of remote switch nodes upon no one of the plurality of local switch nodes having capability to store the first message and the one of the plurality of remote switch nodes having capability to store the first message.

14. The method of claim 1 wherein the step of receiving further comprises receiving a list of destination communication terminals to which the first message is to be sent; and the step of storing by the first switch node comprises the step of transmitting to each of the destination communication terminals identified on the list information identifying that the first message has been stored for each on the first switch node.

15. The method of claim 14 further comprises the step of storing the transmitted information by each of the destination communication terminals identified on the list.

16. The method of claim 15 further comprises the step of accessing the first message by one of the destination terminals in response to a request from a user of the one of the destination terminals.

17. The method of claim 16 wherein the step of accessing comprises the step of playing back the first message to the one of the destination terminals by the first switch node; and updating by the first switch node a record to indicate that the one of the destination terminals has accessed the first message.

18. The method of claim 1 wherein the step of receiving further comprises receiving a list of destination communication terminals to which the first message is to be sent;

the step of requesting by the first switch node comprises the step of transmitting to the second switch node the list of destination communication terminals to which the first message is to be sent;

the step of storing by the second switch node comprises the step of transmitting to each of the destination communication terminals identified on the list information identifying that the first message has been stored for each on the second switch node.

19. The method of claim 18 further comprises the step of storing the transmitted information by each of the destination communication terminals identified on the list.

20. The method of claim 19 further comprises the step of accessing the first message by one of the destination terminals in response to a request from a user of the one of the destination terminals.

21. The method of claim 20 wherein the step of accessing comprises the step of playing back the first message to the one of the destination terminals by the second switch node; and updating by the second switch node a record to indicate that the one of the destination terminals has accessed the first message.

22. An apparatus for providing messaging service within a switching system having a plurality of switch nodes, comprising:

means for receiving a request to store a first message for a communication terminal by a first switch node;

means for determining ability to store the first message by the first switch node;

means for storing the first message by the first switch node in response to the means for determining indicating capability of the first switch node to store the first message;

means for requesting by the first switch node that a second switch node having capability store the first message in response to the means for determining indicating the first switch node incapable of storing the first message;

means for storing the first message by the second switch node in response to the request from the first switch node upon the first switch node being incapable of storing the first message; and means for transmitting by the second switch node a second message to the first switch node with the second message having information identifying the first message and the second switch node upon the second switch node storing the first message.

23. The apparatus of claim 22 further comprises means in the first switch node for storing the identification information in a message record.

24. The apparatus of claim 23 further comprises means in first switch node for requesting the transfer of the first message from the second switch node upon the second switch node storing the first message using the stored identification information upon the first switch node receiving a play back request for messages of the communication terminal; and means in the second switch node for transferring the first message to the first switch node in response to the means for requesting upon the second switch node storing the first message.

25. The apparatus of claim 24 further comprises means in the first switch node in response to the means for transferring the first message for playing back the first message to the communication terminal.

26. The apparatus of claim 25 wherein the means for transferring the first message comprises means for communicating the first message in partial portions to the first switch.

27. The apparatus of claim 23 further comprises means in a third switch node for requesting the message record from the first switch node upon the third switch node receiving a play back request from the communication terminal;

means for transmitting the message record to the third switch node in response to the means for requesting;

means in third switch node for requesting the transfer of the first message from the second switch node upon the second switch node storing the first message using the stored identification information in message; and means for transferring the first message to the third switch upon the second switch node storing the first message in response to the means for requesting.

28. The apparatus of claim 27 further comprises means in the third switch node for playing back the first message to the communication terminal in response to the means for transferring the first message.

29. The apparatus of claim 28 wherein the means for transferring the first message comprises means for communicating the first message in partial portions to the third switch node.

30. The apparatus of claim 28 further comprises means in the third switch node for updating the message record; and means in the third switch node for transmitting the updated message record back to the first switch node.

31. The apparatus of claim 22 wherein the first switch node comprises a plurality of networks with each network having a service circuit and a storage unit for storing messages and the apparatus further comprises means for processing the first message in a service circuit of a network terminating the communication terminal upon a determination that the service circuit of the network terminating the communication terminal can process the first message; and means for storing the processed first message in a storage unit of the network terminating the communication terminal upon a determination that the storage unit of the network terminating the communication terminal can store the first message.

32. The apparatus of claim 31 wherein the apparatus further comprises means for processing the first message in a service circuit of a first one of the plurality of networks upon a determination that both the service circuit and the storage unit of the network terminating the communication terminal can not process and store the first message; and means for storing the first message in a storage unit of a second one of the plurality of networks upon a determination that both the service circuit and the storage unit of the network terminating the communication terminal can not process and store the first message.

33. The apparatus of claim 22 wherein the means for receiving comprises means for receiving a call from another communication terminal;

means for reading information defining the request from the other communication terminal; and means for redirecting the call from the first switch node in response to the means for determining indicating the first switch node incapable of storing the first message.

34. The apparatus of claim 22 wherein the means for requesting comprises means for transmitting a storing request to a one of a plurality of local switch nodes upon the one of the plurality of local switch nodes having capability to store the first message; and means for transmitting the storing request to one of a plurality of remote switch nodes upon no one of the plurality of local switch nodes having capability to store the first message and the one of the plurality of remote switch nodes having capability to store the first message.

35. The apparatus of claim 22 wherein the means for receiving further comprises receiving a list of destination communication terminals to which the first message is to be sent; and the means for storing by the first switch node comprises means for transmitting to each of the destination communication terminals identified on the list information identifying that the first message has been stored for each on the first switch node.

36. The apparatus of claim 35 further comprises means for storing the transmitted information by each of the destination communication terminals identified on the list.

37. The apparatus of claim 36 further comprises means for accessing the first message by one of the destination terminals in response to a request from a user of the one of the destination terminals.

38. The apparatus of claim 37 wherein the means for accessing comprises means for playing back the first message to the one of the destination terminals by the first switch node; and means for updating by the first switch node a record to indicate that the one of the destination terminals has accessed the first message.

39. The apparatus of claim 22 wherein the means for receiving further comprises receiving a list of destination communication terminals to which the first message is to be sent;

the means for requesting by the first switch node comprises means for transmitting to the second switch node the list of destination communication terminals to which the first message is to be sent;

the means for storing by the second switch node comprises means for transmitting to each of the destination communication terminals identified on the list information identifying that the first message has been stored for each on the second switch node.

40. The apparatus of claim 39 further comprises means for storing the transmitted information by each of the destination communication terminals identified on the list.

41. The apparatus of claim 40 further comprises means for accessing the first message by one of the destination terminals in response to a request from a user of the one of the destination terminals.

42. The apparatus of claim 41 wherein the means for accessing comprises means for playing back the first message to the one of the destination terminals by the second switch node; and means for updating by the second switch node a record to indicate that the one of the destination terminals has accessed the first message.

\* \* \* \* \*